United States Patent
Agarwal et al.

(10) Patent No.: US 10,827,529 B2
(45) Date of Patent: Nov. 3, 2020

(54) RANDOM ACCESS COLLISION REDUCTION BASED ON MULTIPLE UPLINK GRANTS

(71) Applicant: QUALCOMM Incorporated, San Diego, CA (US)

(72) Inventors: Ravi Agarwal, San Diego, CA (US); Gavin Bernard Horn, La Jolla, CA (US); Tingfang Ji, San Diego, CA (US); Joseph Binamira Soriaga, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 213 days.

(21) Appl. No.: 15/474,133

(22) Filed: Mar. 30, 2017

(65) Prior Publication Data

US 2017/0374686 A1 Dec. 28, 2017

Related U.S. Application Data

(60) Provisional application No. 62/354,548, filed on Jun. 24, 2016.

(51) Int. Cl.
*H04W 74/08* (2009.01)
*H04W 72/08* (2009.01)
(Continued)

(52) U.S. Cl.
CPC ..... *H04W 74/0833* (2013.01); *H04W 72/085* (2013.01); *H04W 72/14* (2013.01); *H04W 72/1294* (2013.01); *H04W 88/02* (2013.01)

(58) Field of Classification Search
None
See application file for complete search history.

(56) References Cited

U.S. PATENT DOCUMENTS

| 7,903,818 B2 * | 3/2011 | Park | H04W 74/002 370/335 |
| 10,477,590 B2 * | 11/2019 | Wu | H04W 72/14 |

(Continued)

FOREIGN PATENT DOCUMENTS

EP 2182766 A1 5/2010

OTHER PUBLICATIONS

3GPP, "3rd Generation Partnership Project; Technical Specification Group Radio Access Network; Evolved Universal Terrestrial Radio Access (E-UTRA); Medium Access Control (MAC) Protocol Specification (Release 13)," 3GPP Technical Specification, Mar. 2016, 85 pgs., 3GPP TS 36.321, V13.1.0, XP051088535, 3rd Generation Partnership Project, Sophia-Antipolis Valbonne, France.

(Continued)

*Primary Examiner* — Sithu Ko
*Assistant Examiner* — Emmanuel J Maglo
(74) *Attorney, Agent, or Firm* — Holland & Hart LLP

(57) ABSTRACT

Techniques are described for wireless communication. A method for wireless communication at a user equipment (UE) includes transmitting a random access preamble; receiving a random access response message that includes a plurality of uplink grants associated with the random access preamble, in which each uplink grant in the plurality of uplink grants is associated with a different transmission resource; selecting an uplink grant from the plurality of uplink grants; and transmitting using the selected uplink grant. A method of wireless communication at a network access device includes receiving a random access preamble; and transmitting a random access response message that includes a plurality of uplink grants associated with the random access preamble, in which each uplink grant in the plurality of uplink grants is associated with a different transmission resource.

26 Claims, 14 Drawing Sheets

(51) Int. Cl.
*H04W 72/14* (2009.01)
*H04W 72/12* (2009.01)
*H04W 88/02* (2009.01)

(56) References Cited

U.S. PATENT DOCUMENTS

| | | | |
|---|---|---|---|
| 2009/0238366 A1* | 9/2009 | Park | H04W 74/002 |
| | | | 380/270 |
| 2009/0323607 A1* | 12/2009 | Park | H04B 7/2628 |
| | | | 370/329 |
| 2010/0074204 A1* | 3/2010 | Meylan | H04L 1/1822 |
| | | | 370/329 |
| 2011/0128928 A1 | 6/2011 | Lin et al. | |
| 2011/0243075 A1* | 10/2011 | Luo | H04W 74/004 |
| | | | 370/329 |
| 2012/0275381 A1* | 11/2012 | Kim | H04W 74/08 |
| | | | 370/328 |
| 2013/0010722 A1* | 1/2013 | Suzuki | H04L 1/1854 |
| | | | 370/329 |
| 2014/0010173 A1* | 1/2014 | Zakrzewski | H04W 8/26 |
| | | | 370/329 |
| 2014/0177573 A1* | 6/2014 | Han | H04W 72/1242 |
| | | | 370/329 |
| 2014/0362780 A1 | 12/2014 | Malladi et al. | |
| 2015/0139175 A1* | 5/2015 | Ratasuk | H04L 5/0051 |
| | | | 370/330 |
| 2015/0181406 A1* | 6/2015 | Seo | H04W 8/005 |
| | | | 370/329 |
| 2015/0319774 A1* | 11/2015 | Cai | H04W 72/14 |
| | | | 370/329 |
| 2016/0021646 A1* | 1/2016 | Hu | H04W 72/1278 |
| | | | 370/329 |
| 2018/0139668 A1* | 5/2018 | Takahashi | H04W 72/1294 |

OTHER PUBLICATIONS

ISA/EP, International Search Report and Written Opinion of the International Searching Authority, Int'l Application No. PCT/US2017/038735, dated Sep. 25, 2017, European Patent Office, Rijswijk, NL, 16 pgs.

Qualcomm Incorporated, "Considerations on RA Procedure in NR," 3GPP TSG-RAN WG2 Meeting #97bis, R2-1703570, Spokane, USA, Apr. 3-7, 2017, 2 pgs., XP051254507, 3rd Generation Partnership Project.

* cited by examiner

RANDOM ACCESS COLLISION REDUCTION BASED ON MULTIPLE UPLINK GRANTS

CROSS REFERENCES

The present application for patent claims priority to U.S. Provisional Patent Application No. 62/354,548 by Agarwal, et al., entitled "RANDOM ACCESS COLLISION REDUCTION BASED ON MULTIPLE UPLINK GRANTS," filed Jun. 24, 2016, assigned to the assignee hereof, and hereby expressly incorporated by reference herein in its entirety.

INTRODUCTION

The present disclosure, for example, relates to wireless communication systems, and more particularly to random access collision reduction based on multiple uplink grants.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

In some examples, a wireless multiple-access communication system may include a number of base stations, each simultaneously supporting communication for multiple communication devices, otherwise known as user equipments (UEs). In a Long-Term Evolution (LTE) or LTE-Advanced (LTE-A) network, a set of one or more base stations may define an eNodeB (eNB). In other examples (e.g., in a next generation or 5G network), a wireless multiple access communication system may include a number of smart radio heads (radio heads (RHs)) in communication with a number of access node controllers (ANCs), where a set of one or more radio heads, in communication with an ANC, may define an eNB. A base station or radio head may communicate with a set of UEs on downlink channels (e.g., for transmissions from a base station or radio head to a UE) and uplink channels (e.g., for transmissions from a UE to a base station or radio head).

In some examples, a UE may perform a random access procedure with a network access device (e.g., a base station, an RH, an ANC, or an eNB). Other UEs may additionally or alternatively perform a random access procedure. When two or more UEs perform a random access procedure based on the same random access preamble, transmissions of the UEs may collide, and none of the UEs may perform the random access procedure successfully or access a network via the network access device.

SUMMARY

A method for wireless communication at a UE is described. The method may include transmitting a random access preamble, receiving a random access response message that includes a plurality of uplink grants associated with the random access preamble, selecting an uplink grant from the plurality of uplink grants, and transmitting using the selected uplink grant. Each uplink grant in the plurality of uplink grants may be associated with a different transmission resource.

An apparatus for wireless communication at a UE is described. The apparatus may include means for transmitting a random access preamble, means for receiving a random access response message that includes a plurality of uplink grants associated with the random access preamble, means for selecting an uplink grant from the plurality of uplink grants, and means for transmitting using the selected uplink grant. Each uplink grant in the plurality of uplink grants may be associated with a different transmission resource.

Another apparatus for wireless communication at a UE is described. The apparatus may include a processor, memory in electronic communication with the processor, and instructions stored in the memory. The instructions may be operable to cause the processor to transmit a random access preamble, receive a random access response message that includes a plurality of uplink grants associated with the random access preamble, select an uplink grant from the plurality of uplink grants, and transmit using the selected uplink grant. Each uplink grant in the plurality of uplink grants may be associated with a different transmission resource.

A non-transitory computer-readable medium for wireless communication at a UE is described. The non-transitory computer-readable medium may include instructions operable to cause a processor to transmit a random access preamble, receive a random access response message that includes a plurality of uplink grants associated with the random access preamble, select an uplink grant from the plurality of uplink grants, and transmit using the selected uplink grant. Each uplink grant in the plurality of uplink grants may be associated with a different transmission resource.

In some examples of the method, apparatus, and non-transitory computer-readable medium described above, a first transmission resource associated with a first uplink grant and a second transmission resource associated with a second uplink grant may include at least one of different transmission times, or different transmission frequencies, or different scrambling codes, or different channelization codes, or different beam indices, or different UE identifiers (IDs), or combinations thereof.

In some examples of the method, apparatus, and non-transitory computer-readable medium described above, selecting an uplink grant may include randomly selecting an uplink grant from the plurality of uplink grants.

In some examples of the method, apparatus, and non-transitory computer-readable medium described above, at least two of the uplink grants may be associated with different feature sets, and the selected uplink grant may be selected based at least in part on a feature set supported by the UE.

In some examples of the method, apparatus, and non-transitory computer-readable medium described above, at least two of the uplink grants may be associated with different maximum channel bandwidths, and the selected uplink grant may be selected based at least in part on a maximum channel bandwidth supported by the UE.

In some examples of the method, apparatus, and non-transitory computer-readable medium described above, at least two of the uplink grants may be associated with different payload sizes, and the selected uplink grant may be selected based at least in part on an amount of data in a transmit buffer of the UE.

In some examples of the method, apparatus, and non-transitory computer-readable medium described above, at least two of the uplink grants may be associated with at least one of different sets of services, or different service requirements, or different quality of service (QoS) profiles, or different access priorities, or different slices, or combinations thereof, and wherein the selected uplink grant is selected based at least in part on a service used by the UE, or a service requirement of the UE, or a QoS requirement of the UE, or an access priority of the UE, or different slices, or combinations thereof.

A method for wireless communication at a network access device is described. The method may include receiving a random access preamble, and transmitting a random access response message that includes a plurality of uplink grants associated with the random access preamble. Each uplink grant in the plurality of uplink grants may be associated with a different transmission resource.

An apparatus for wireless communication at a network access device is described. The apparatus may include means for receiving a random access preamble, and means for transmitting a random access response message that includes a plurality of uplink grants associated with the random access preamble. Each uplink grant in the plurality of uplink grants may be associated with a different transmission resource.

Another apparatus for wireless communication at a network access device is described. The apparatus may include a processor, memory in electronic communication with the processor, and instructions stored in the memory. The instructions may be operable to cause the processor to receive a random access preamble, and transmit a random access response message that includes a plurality of uplink grants associated with the random access preamble. Each uplink grant in the plurality of uplink grants may be associated with a different transmission resource.

A non-transitory computer-readable medium for wireless communication at a network access device is described. The non-transitory computer-readable medium may include instructions operable to cause a processor to receive a random access preamble, and transmit a random access response message that includes a plurality of uplink grants associated with the random access preamble. Each uplink grant in the plurality of uplink grants may be associated with a different transmission resource.

In some examples of the method, apparatus, and non-transitory computer-readable medium described above, a first transmission resource associated with a first uplink grant and a second transmission resource associated with a second uplink grant may include at least one of different transmission times, or different transmission frequencies, or different scrambling codes, or different channelization codes, or different beam indices, or different UE IDs, or combinations thereof.

Some examples of the method, apparatus, and non-transitory computer-readable medium described above may further include processes, features, means, or instructions for receiving transmissions from at least two UEs on transmission resources associated with at least two uplink grants in the plurality of uplink grants.

Some examples of the method, apparatus, and non-transitory computer-readable medium described above may further include processes, features, means, or instructions for identifying a number of uplink grants in the plurality of uplink grants based at least in part on a network load, or an estimate of a number of collisions between transmissions of the random access preamble by different UEs, or an estimate of a number of collisions between transmissions by different UEs using a same uplink grant included in the random access response message, or a number of channel elements in a receiver of the network access device, or a number of available transmission resources, or a time of receipt of the random access preamble, or combinations thereof.

Some examples of the method, apparatus, and non-transitory computer-readable medium described above may further include processes, features, means, or instructions for associating at least two of the uplink grants with different feature sets, or different maximum channel bandwidths, or different payload sizes, or different sets of services, or different service requirements, or different QoS profiles, or different access priorities, or different slices, or combinations thereof.

Some examples of the method, apparatus, and non-transitory computer-readable medium described above may further include processes, features, means, or instructions for receiving a transmission, from a UE, on a transmission resource associated with an uplink grant in the plurality of uplink grants. The method, apparatus, and non-transitory computer-readable medium may further include processes, features, means, or instructions for identifying, based at least in part on the transmission resource on which the transmission is received, at least one of a feature set supported by the UE, or a channel bandwidth supported by the UE, or an amount of data in a transmit buffer of the UE, or a service used by the UE, or a service requirement of the UE, or a QoS requirement of the UE, or an access priority of the UE, or different slices, or combinations thereof.

In some examples of the method, apparatus, and non-transitory computer-readable medium described above, the identified number of uplink grants may comprise of one uplink grant. In other examples, the identified number of uplink grants may include a plurality of uplink grants.

Another method for wireless communication at a network access device is described. The method may include receiving a random access preamble, identifying a number of uplink grants to associate with the random access preamble, and transmitting a random access response message including the identified number of uplink grants. The identified number of uplink grants may include at least one uplink grant associated with at least one transmission resource. The identified number of uplink grants may be based at least in part on a time-variable parameter.

Another apparatus for wireless communication at a network access device is described. The apparatus may include means for receiving a random access preamble, means for identifying a number of uplink grants to associate with the random access preamble, and means for transmitting a random access response message including the identified number of uplink grants. The identified number of uplink grants may include at least one uplink grant associated with at least one transmission resource. The identified number of uplink grants may be based at least in part on a time-variable parameter.

Another apparatus for wireless communication at a network access device is described. The apparatus may include a processor, memory in electronic communication with the processor, and instructions stored in the memory. The instructions may be operable to cause the processor to receive a random access preamble, identify a number of uplink grants to associate with the random access preamble, and transmit a random access response message including the identified number of uplink grants. The identified number of uplink grants may include at least one uplink grant associated with at least one transmission resource. The identified number of uplink grants may be based at least in part on a time-variable parameter.

Another non-transitory computer-readable medium for wireless communication at a network access device is described. The non-transitory computer-readable medium may include instructions operable to cause a processor to receive a random access preamble, identify a number of uplink grants to associate with the random access preamble, and transmit a random access response message including the identified number of uplink grants. The identified number of uplink grants may include at least one uplink grant associated with at least one transmission resource. The identified number of uplink grants may be based at least in part on a time-variable parameter.

In some examples of the method, apparatus, and non-transitory computer-readable medium described above, the number of uplink grants may be identified based at least in part on a network load, or an estimate of a number of collisions between transmissions of the random access preamble by different UEs, or an estimate of a number of collisions between transmissions by different UEs using a same uplink grant included in the random access response message, or a number of channel elements in a receiver of the network access device, or a number of available transmission resources, or a time of receipt of the random access preamble, or combinations thereof.

In some examples of the method, apparatus, and non-transitory computer-readable medium described above, the identified number of uplink grants may comprise of one uplink grant. In other examples, the identified number of uplink grants may include a plurality of uplink grants.

Some examples of the method, apparatus, and non-transitory computer-readable medium described above may further include processes, features, means, or instructions for receiving a transmission, from a UE, on a transmission resource associated with an uplink grant in the plurality of uplink grants. The method, apparatus, and non-transitory computer-readable medium may further include processes, features, means, or instructions for identifying, based at least in part on the transmission resource on which the transmission is received, at least one of a feature set supported by the UE, or a channel bandwidth supported by the UE, or an amount of data in a transmit buffer of the UE, or a service used by the UE, or a service requirement of the UE, or a QoS requirement of the UE, or an access priority of the UE, or different slices, or combinations thereof.

The foregoing has outlined rather broadly the techniques and technical advantages of examples according to the disclosure in order that the detailed description that follows may be better understood. Additional techniques and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or functions may have the same reference label.

Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
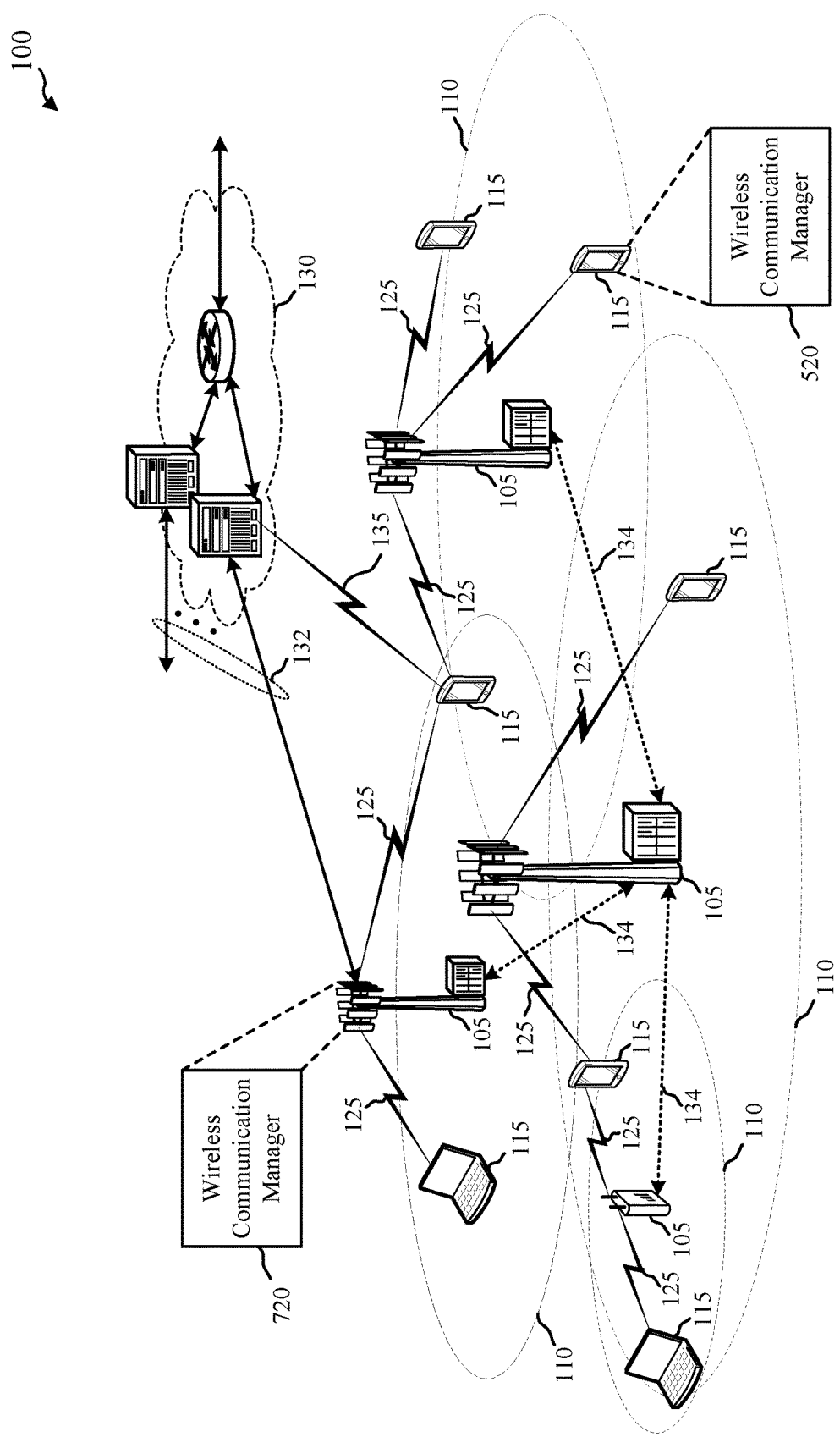
FIG. 1 illustrates an example of a wireless communication system, in accordance with one or more aspects of the present disclosure.

The present disclosure describes techniques for reducing random access collisions between two or more UEs. At times (e.g., when initially accessing a network, or during a handover), a UE may perform a random access procedure with a network access device. Some random access procedures (e.g., random access procedures performed when initially accessing a network) may be contention-based, meaning that two or more UEs may perform a random access procedure at the same time and contend for the same random access resources. When each UE performs its random access procedure using different resources, the random access procedures performed by the UEs may all be performed successfully (e.g., when performing a random access procedure to initially access a network, a UE may succeed in obtaining access to the network). However, in some instances, two or more UEs may perform their random access procedures using the same resource(s), and in these instances, the random access procedures performed by one or more (or all) of the UEs may not complete successfully. The UE(s) for which random access procedures do not complete successfully may have to perform their random access procedure again. Failure to complete a random access procedure successfully may result in inefficiency and delay (e.g., a delay in obtaining access to a network).

In some contention-based random access procedures, a UE may randomly select a random access preamble from a set of predetermined preamble sequences and transmit a message including the random access preamble to a network access device. When a random access preamble is randomly selected by a UE, it is possible that two or more UEs may select the same random access preamble.

Upon receiving a message including a random access preamble, a network access device may be unaware of whether one, two, or more UEs transmitted the same message including the same random access preamble (e.g., because all of the UEs may transmit the same random access preamble on the same resource(s)). In response to receiving a random access preamble, a network access device may transmit a random access response message. The random access response message may include an uplink grant that a UE may use to transmit a first scheduled uplink transmission to the network access device. Because, at the time the network access device transmits the random access response message, the network access device does not know the identity (or identities) of the UE or UEs that transmitted a message including a random access preamble, the uplink grant may not be specific to any particular UE, and any UE may use the uplink grant to make a first scheduled uplink transmission to the network access device. Thus, when two or more UEs transmit a message including the same random access preamble, all of these UEs may transmit a first scheduled uplink transmission using the same uplink grant, resulting in contention. A network access device may be unable to resolve such contention.

To reduce the probability of collisions between first scheduled uplink transmissions of different UEs (i.e., different UEs that transmit messages including the same random access preamble at the same time), a network access device may transmit a random access response message that includes a plurality of uplink grants (e.g., N uplink grants, where N is an integer greater than or equal to 2). Each uplink grant in the plurality of uplink grants may be associated with a different transmission resource, such that first scheduled uplink transmissions by different UEs using different uplink grants will not collide. If UEs select uplink grants at random, the probability that first scheduled uplink transmissions of UEs performing random access procedures based on the same random access preamble, at the same time, may be reduced by a factor of N. Additionally or alternatively, a network access device may transmit a random access response message that includes one or more uplink grants, with the number of uplink grants that are included in the random access response message being determined based at least in part on a time-variable parameter. In some examples, the time-variable parameter may be based on factors such as a network load or an estimated number of random access collisions. In this manner, measures may be taken to reduce random access collisions at times when random access collisions are believed to be more likely.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various operations may be added, omitted, or combined. Additionally or alternatively, features described with respect to some examples may be combined in other examples.

FIG. 1 illustrates an example of a wireless communication system 100, in accordance with one or more aspects of the present disclosure. The wireless communication system 100 may include network access devices (e.g., base stations 105, gNodeBs (gNBs), and/or radio heads (RHs)), UEs 115, and a core network 130. The core network 130 may provide user authentication, access authorization, tracking, Internet Protocol (IP) connectivity, and other access, routing, or mobility functions. The base stations 105 may interface with the core network 130 through backhaul links 132 (e.g., S1, etc.) and may perform radio configuration and scheduling for communication with the UEs 115, or may operate under the control of a base station controller (not shown). In various examples, the base stations 105 may communicate, either directly or indirectly (e.g., through core network 130), with each other over backhaul links 134 (e.g., X1, etc.), which may be wired or wireless communication links. Wireless communication system 100 may support synchronous or asynchronous operation.

The core network 130 may provide user authentication, access authorization, tracking, IP connectivity, and other access, routing, or mobility functions. At least some of the network access devices 105 (e.g., eNBs, gNBs) 105-a or ANCs may interface with the core network 130 through backhaul links 132 (e.g., S1, etc.) and may perform radio configuration and scheduling for communication with the UEs 115. In various examples, the ANCs may communicate, either directly or indirectly (e.g., through core network 130), with each other over backhaul links 134 (e.g., X1, X2, etc.), which may be wired or wireless communication links. A UE 115 may communicate with the core network 130 through communication link 135. Each ANC may additionally or alternatively communicate with a number of UEs 115 through a number of smart radio heads. In an alternative configuration of the wireless communication system 100, the functionality of an ANC may be provided by a radio head or distributed across the radio heads of an eNB.

The base stations 105 may wirelessly communicate with the UEs 115 via one or more base station antennas. Each of the base stations 105 may provide communication coverage for a respective geographic coverage area 110. In some examples, a base station 105 may be referred to as a base transceiver station, a radio base station, an access point, a radio transceiver, a NodeB, an eNB, a Home NodeB, a Home eNodeB, or some other suitable terminology. The geographic coverage area 110 for a base station 105 may be divided into sectors making up a portion of the coverage area (not shown). The wireless communication system 100 may include base stations 105 of different types (e.g., macro or small cell base stations). There may be overlapping geographic coverage areas 110 for different technologies.

In some examples, the wireless communication system 100 may include a new radio (i.e., 5G) network. In some examples, the wireless communication system 100 may include an LTE/LTE-A network. In LTE/LTE-A networks, the term eNB may be used to describe the base stations 105. The wireless communication system 100 may be a Heterogeneous LTE/LTE-A network in which different types of eNBs provide coverage for various geographical regions. For example, each eNB or base station 105 may provide communication coverage for a macro cell, a small cell, or other types of cell. The term "cell" is a 3GPP term that can be used to describe a base station, a radio head, a carrier or component carrier associated with a base station or a radio head, or a coverage area (e.g., sector, etc.) of a carrier or base station, depending on context.

A macro cell may cover a relatively large geographic area (e.g., several kilometers in radius) and may allow unrestricted access by UEs with service subscriptions with the network provider. A small cell may be a lower-powered base station, as compared with a macro cell that may operate in the same or different (e.g., licensed, unlicensed, etc.) spectrums as macro cells. Small cells may include pico cells, femto cells, and micro cells according to various examples. A pico cell may cover a relatively smaller geographic area and may allow unrestricted access by UEs with service subscriptions with the network provider. A femto cell additionally or alternatively may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers). A gNB for a macro cell may be referred to as a macro gNB. A gNB for a small cell may be referred to as a small cell gNB, a pico gNB, a femto gNB, or a home gNB. A gNB may support one or multiple (e.g., two, three, four, and the like) cells (e.g., component carriers).

The wireless communication system 100 may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may additionally or alternatively use Hybrid ARQ (HARQ) to provide retransmission at the MAC layer to improve link efficiency. In the control plane, the Radio Resource Control (RRC) protocol layer may provide establishment, configuration, and maintenance of an RRC connection between a UE 115 and the base stations 105 or core network 130 supporting radio bearers for the user plane data. At the physical (PHY) layer, the transport channels may be mapped to physical channels.

The UEs 115 may be dispersed throughout the wireless communication system 100, and each UE 115 may be stationary or mobile. A UE 115 may additionally or alternatively include or be referred to by those skilled in the art as a mobile station, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a smart phone, a personal digital assistant (PDA), a wireless modem, a wireless communication device, a handheld device, a tablet computer, a laptop computer, a cordless phone, a wireless local loop (WLL) station, etc. A UE may be able to communicate with various types of base stations and network equipment, including macro eNBs, small cell eNBs, relay base stations, and the like.

The communication links 125 shown in wireless communication system 100 may include downlinks (DLs), from a base station 105 to a UE 115, or uplinks (ULs), from a UE 115 to a base station 105. The downlinks may also be called forward links, while the uplinks may also be called reverse links.

In some examples, each communication link 125 may include one or more carriers, where each carrier may be a signal made up of multiple sub-carriers (e.g., waveform signals of different frequencies) modulated according to the various radio technologies described above. Each modulated signal may be transmitted on a different sub-carrier and may carry control information (e.g., reference signals, control channels, etc.), overhead information, user data, etc. The communication links 125 may transmit bidirectional communications using a frequency domain duplexing (FDD) operation (e.g., using paired spectrum resources) or a time domain duplexing (TDD) operation (e.g., using unpaired spectrum resources). Frame structures for FDD operation (e.g., frame structure type 1) and TDD operation (e.g., frame structure type 2) may be defined.

In some examples of the wireless communication system 100, base stations 105, or UEs 115 may include multiple antennas for employing antenna diversity schemes to improve communication quality and reliability between base stations 105 and UEs 115. Additionally or alternatively, base stations 105 or UEs 115 may employ multiple-input, multiple-output (MIMO) techniques that may take advantage of multi-path environments to transmit multiple spatial layers carrying the same or different coded data.

The wireless communication system 100 may support operation on multiple cells or carriers, a feature which may be referred to as carrier aggregation (CA) or dual-connectivity operation. A carrier may also be referred to as a component carrier (CC), a layer, a channel, etc. The terms "carrier," "component carrier," "cell," and "channel" may be used interchangeably herein. Carrier aggregation may be used with both FDD and TDD component carriers.

In an LTE/LTE-A network, a UE 115 may be configured to communicate using up to five CCs when operating in a carrier aggregation mode or dual-connectivity mode. One or more of the CCs may be configured as a DL CC, and one or more of the CCs may be configured as an uplink (UL) CC. Additionally or alternatively, one of the CCs allocated to a UE 115 may be configured as a primary CC (PCC), and the remaining CCs allocated to the UE 115 may be configured as secondary CCs (SCCs).

At times, a UE 115 may perform a random access procedure with a network access device (e.g., a base station 105). A UE 115 may perform a random access procedure with a base station 105 of an LTE/LTE-A network, for example, when initially accessing the LTE/LTE-A network from an idle state (e.g., when performing initial access from an RRC_IDLE state), or when performing an RRC Connection Re-establishment procedure, or in conjunction with a handover procedure. The performance of a random access procedure when initially accessing a LTE/LTE-A network from an idle state is the most common type of random access procedure. A UE may additionally or alternatively perform a random access procedure with a network access device upon downlink data arrival when in an RRC_CONNECTED state (e.g., when UL synchronization is "non-synchronized"), or upon uplink data arrival when in an RRC_CONNECTED state (e.g., when UL synchronization is "non-synchronized," or when no Physical Uplink Control Channel (PUCCH) resources are available for transmitting a SR). A UE may additionally or alternatively perform a random access procedure with a network access device for a positioning purpose when in an RRC_CONNECTED state (e.g., when a timing advance is needed for UE positioning). In some examples, a UE may perform a random access procedure with a network access device in a CA or dual-connectivity scenario.

Random access procedures may be contention-based or non-contention-based. Contention-based random access procedures are more common, and include random access procedures performed when initially accessing a LTE/LTE-A network from an idle state. Non-contention-based random access procedures include, for example, random access procedures performed in conjunction with a handover procedure. Techniques described in the present disclosure pertain to a contention-based random access procedure.

In some examples, a UE 115 may include a wireless communication manager 520. The wireless communication manager 520 may be used to transmit a random access preamble (e.g., to a base station 105), receive a random access response message that includes a plurality of uplink grants associated with the random access preamble, select an uplink grant from the plurality of uplink grants, and transmit using the selected uplink grant (e.g., transmit a first scheduled uplink transmission to the base station 105). Each uplink grant in the plurality of uplink grants may be associated with a different transmission resource, so that transmissions by multiple UEs 115 using multiple ones of the uplink grants do not collide.

In some examples, a base station 105 may include a wireless communication manager 720. The wireless communication manager 720 may be used to receive a random access preamble from one or more of the UEs 115, and transmit a random access response message that includes a plurality of uplink grants associated with the random access preamble. Each uplink grant in the plurality of uplink grants may be associated with a different transmission resource, so that transmissions by multiple UEs 115 using multiple ones of the uplink grants do not collide. In alternative examples, the wireless communication manager 720 may be used to receive a random access preamble from one or more of the UEs 115, identify a number of uplink grants to associate with the random access preamble, and transmit a random access response message including the identified number of uplink grants. The identified number of uplink grants may include a single uplink grant or a plurality of uplink grants, each of which is associated with at least one transmission resource. The identified number of uplink grants may be based at least in part on a time-variable parameter, such as a network load, or an estimate of a number of collisions between transmissions of the random access preamble by different UEs, or an estimate of a number of collisions between transmissions by different UEs using a same uplink grant included in the random access response message, or a number of channel elements in a receiver of the network access device, or a number of available transmission resources, or a time of receipt of the random access preamble, or combinations thereof.

Figure 2:
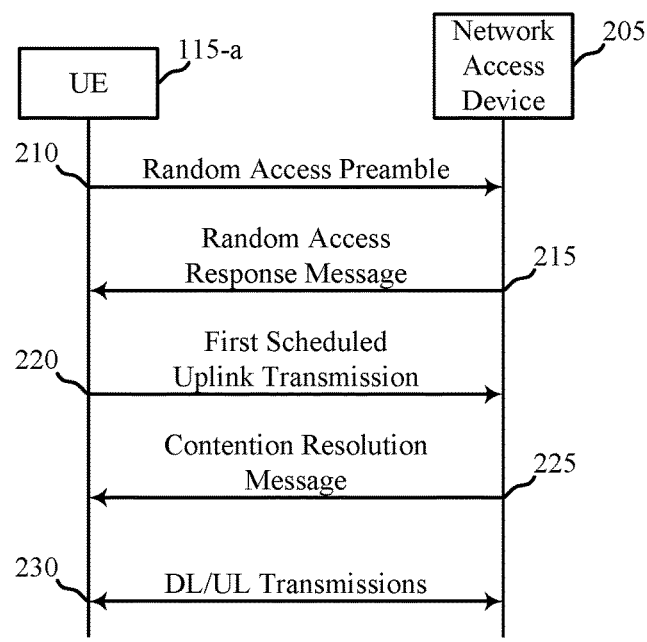
FIG. 2 shows a message flow between a UE and a network access device during performance of a contention-based random access procedure, in accordance with one or more aspects of the present disclosure.

FIG. 2 shows a message flow 200 between a UE 115-a and a network access device 205 during performance of a contention-based random access procedure, in accordance with one or more aspects of the present disclosure. The UE 115-a may be an example of aspects of the UEs 115 described with reference to FIG. 1. The network access device 205 may an example of aspects of a base station 105 described with reference to FIG. 1, or an example of aspects of an eNB, RH, ANC, or access point, for example.

The message flow 200 includes four messages, including a first message (Msg1) transmitted by the UE 115-a to the network access device 205 at 210, a second message (Msg2) transmitted by the network access device 205 to the UE 115-a at 215, a third message (Msg3) transmitted by the UE 115-a to the network access device 205 at 220, and a fourth message (Msg4) transmitted by the network access device 205 to the UE 115-a at 225.

At 210, a message including a random access preamble may be transmitted on a random access channel (RACH) of an uplink. In some examples, the random access preamble may be selected from a plurality of preamble sequences, such as a set of 64 preamble sequences associated with a cell. The UE 115-a may identify the plurality of preamble sequences from system information (SI) broadcast by the network access device 205. In some examples, the preamble sequences may be divided into two or more subsets, and the UE 115-a may select a random access preamble from a predetermined or derived one of the subsets.

At 215, and in response to detecting the random access preamble transmitted at 210, the network access device 205 may transmit a random access response (RAR) message. In some examples, the RAR message may be transmitted on a downlink shared channel (DL-SCH), using a random access radio network temporary identifier (RA-RNTI) as a physical ID. If the network access device 205 does not detect the random access preamble transmitted at 210, the network access device 205 will not transmit a RAR message at 215.

The RAR message may include, for example, an index corresponding to the detected random access preamble (e.g., an index of a detected preamble sequence), an uplink grant (e.g., a grant of transmission resources on an uplink shared channel (UL-SCH), an indication of a timing advance, or a temporary cell RNTI (TC-RNTI). In some examples, multiple RAR messages (e.g., RAR messages corresponding to different random access preambles received from different UEs) may be included in a single payload transmitted at 215.

Upon receiving one or more RAR messages transmitted at 215, the UE 115-a may identify a RAR message intended for the UE 115-a based at least in part on detecting, in a RAR message, an index corresponding to the random access preamble transmitted by the UE 115-a at 210. When multiple UEs transmit the same random access preamble on the same transmission resources at 210, all of the UEs may use the same RA-RNTI and identify the same RAR message (transmitted at 215) as intended for itself.

At 220, the UE 115-a may transmit a first scheduled UL transmission using the transmission resources associated with an uplink grant included in a RAR message intended for the UE 115-a. The first scheduled UL transmission may include an RRC Connection Request message and include an identifier of the UE 115-a (i.e., a UE identifier). The first scheduled UL transmission may be scrambled using a TC-RNTI included in the RAR message intended for the UE 115-a. Upon transmitting a first scheduled UL transmission at 220, the UE 115-a may start a contention resolution timer.

When multiple UEs (i.e., two or more UEs) transmit the same random access preamble on the same transmission resources at 210, each of the UEs may transmit a first scheduled UL transmission on the same transmission resources at 220 and the transmissions made by all of the UEs will collide. Additionally or alternatively, all of the UEs will receive and interpret the same feedback for their transmissions at 220 (e.g., a HARQ Acknowledgement (ACK) or Non-acknowledgement (NACK) received on a Physical Hybrid-ARQ Indicator Channel (PHICH) or Physical Downlink Control Channel (PDCCH) and associated with the TC-RNTI included in the RAR message transmitted at 215 for the UEs), and will assume the feedback corresponds to their transmission at 220. When the feedback is a HARQ NACK (which is likely), each of the UEs will perform a retransmission of its transmission made at 220, on the same retransmission resources, leading to a collision between the retransmissions.

At 225, and in response to decoding the scheduled UL transmission of the UE 115-a at 220, the network access device 205 may transmit a contention resolution message to the UE 115-a. In some examples, the contention resolution message may be transmitted on the DL-SCH, and may be scrambled using the same TC-RNTI used to scramble the scheduled UL transmission transmitted at 220. However, if the network access device 205 cannot decode the scheduled UL transmission transmitted at 220, the network access device 205 will not transmit a contention resolution message at 225, and the contention resolution timer started by the UE 115-a may expire, thereby causing the UE 115-a to initiate a new random access procedure.

The contention resolution message may include, for example, the UE identifier received in the scheduled UL transmission transmitted at 225. The contention resolution message may additionally or alternatively include other information.

When multiple UEs make a first scheduled UL transmission at 220, and the network access device 205 is able to decode one of the scheduled UL transmissions despite the interference from other scheduled UL transmissions, the network access device 205 may transmit a contention resolution message (at 225) that may be decoded by each of the UEs. When the contention resolution message includes the UE's UE identifier, the UE may pass the contention resolution message to upper layers its protocol stack, assume that its contention-based random access procedure was successful (or that collision resolution was successful), and set its cell RNTI (C-RNTI) to TC-RNTI. When the contention resolution message does not include the UE's UE identifier, or when a UE does not receive the contention resolution message before its contention resolution timer expires, the UE may assume that its contention-based random access procedure failed (or that collision resolution failed) and may perform another contention-based random access procedure.

Following the successful performance of a contention-based random access procedure, the UE 115-a and network access device 205 may communicate via downlink transmissions and/or uplink transmissions beginning at 230.

When multiple UEs perform the random access procedure described with reference to FIG. 2 and transmit the same random access preamble on the same transmission resource at 210, the UEs will transmit scheduled UL transmissions (at 220) that collide and interfere with each other. In some examples, the probability of a collision occurring at 220 may be reduced by increasing the number of preamble sequences from which a UE may select a random access preamble for transmission at 210. However, increasing the numbers of preamble sequences increases the number of random access preambles that the network access device 205 has to monitor for at 215, which can increase both the cost and power consumption of a receiver of the network access device 205.

In some examples, the probability of a collision occurring at 220 may be reduced by allocating different access classes to different UEs, and allocating the different access classes different time slots of random access transmission resources. In this manner, the random access transmission load is distributed over a longer time period. However, this approach can increase the latency associated with random access.

In some examples, the probability of a collision occurring at 220 may be reduced by allocating additional transmission resources (e.g., unoccupied or available transmission resources) for a UE to transmit a first scheduled UL transmission. For example, in response to detecting a random access preamble, the network access device 205 (or another network node to which the network access device 205 is connected) may identify N uplink grants associated with N different transmission resources, and transmit a random access response message (at 215) including the N identified uplink grants. In some examples, the N uplink grants may include a predetermined or semi-static plurality of (e.g., two or more) uplink grants. In some examples, the N uplink grants may be identified periodically, or upon the occurrence of predetermined events, or for each random access preamble received by the network access device 205. In some examples, the N uplink grants may include one uplink grant or a plurality of uplink grants. In some examples, the N uplink grants may be identified based at least in part on a network load (e.g., a load on the network access device 205 or another network node), or an estimate of a number of collisions between transmissions of a random access preamble by different UEs, or an estimate of a number of collisions between transmissions by different UEs using a same uplink grant included in a random access response message, or a number of channel elements in a receiver of the network access device 205, or a number of available transmission resources, or a time of receipt of a random access preamble, or combinations thereof. UEs may select one of the N uplink grants for making a first scheduled UL transmission at 220. The N different transmission resources associated with the N different uplink grants may differ, for example, based at least in part on different transmission times, or different transmission frequencies, or different scrambling codes, or different channelization codes, or different beam indices, or different UE IDs, or combinations thereof. If each UE selects one of the N uplink grants randomly, the probability of a collision occurring at 220 may be reduced by a factor of N. When the additional transmission resources allocated for the N uplink grants include unoccupied or available transmission resources, a scenario in which some of the uplink grants are not selected or used by a UE provides no loss in system capacity, because the transmission resources would not have been used anyway.

Figure 3:
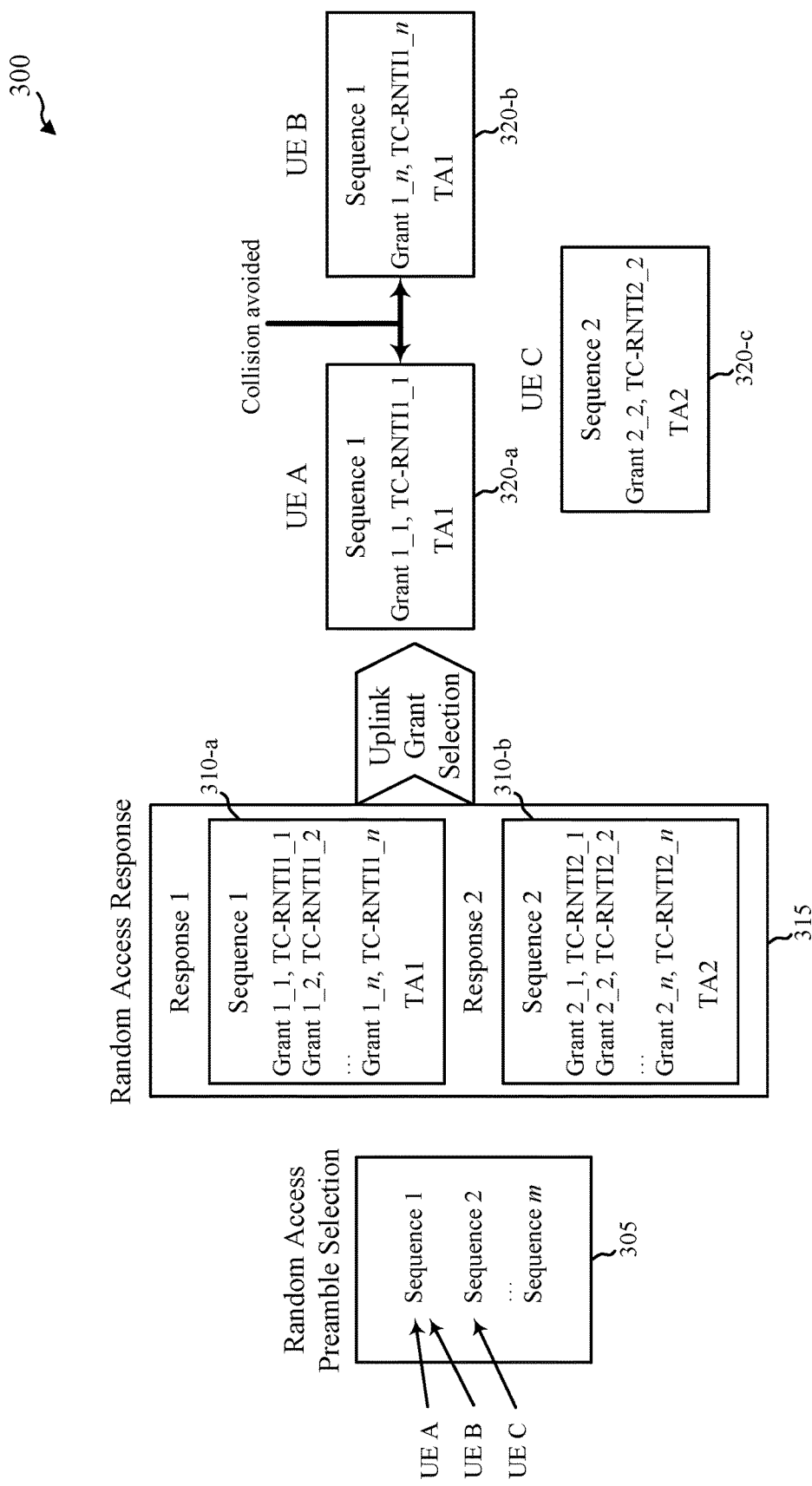
FIG. 3 shows examples of random access preamble selections and uplink grant selections made by a plurality of UEs when performing respective random access procedures at the same time, in accordance with one or more aspects of the present disclosure.

FIG. 3 shows examples of random access preamble selections and uplink grant selections 300 made by a plurality of UEs when performing respective random access procedures at the same time, in accordance with one or more aspects of the present disclosure. By way of example, the selections are made by a first UE (e.g., a UE A), a second UE (e.g., a UE B), and a third UE (e.g., UE C). UE A, UE B, and UE C may be examples of aspects of the UEs 115 described with reference to FIG. 1 or 2.

As shown in FIG. 3, each of UE A, UE B, and UE C may select a random access preamble from a set of preamble sequences 305. By way of example, the set of preamble sequences 305 is shown to include m preamble sequences, including, for example, a Sequence 1, a Sequence 2, and a Sequence m. UE A and UE B are shown to randomly select Sequence 1, and UE C is shown to randomly select Sequence 2. Each of UE A, UE B, and UE C may transmit its selected random access preamble to a network access device. The transmission of Sequence 1 by both UE A and UE B may cause the network access device to receive greater energy Sequence 1 at a higher energy than Sequence 2.

Upon receipt of Sequence 1 and Sequence 2, the network access device may identify a first number of uplink grants 310-a to associate with Sequence 1, and a second number of uplink grants 310-b to associate with Sequence 2. By way of example, the network access device is shown to identify n uplink grants for each of Sequence 1 and Sequence 2, in which n includes a plurality of uplink grants. The n uplink grants are shown to include Grant 1_1 (associated with TC-RNTI1_1), Grant 1_2 (associated with TC-RNTI1_2), and Grant 1_n (associated with TC-RNTI1_n) associated with Sequence 1, and Grant 2_1 (associated with TC-RNTI2_1), Grant 2_2 (associated with TC-RNTI2_2), and Grant 2_n (associated with TC-RNTI2_n) associated with Sequence 2. In other examples, the network access device may identify one uplink grant (e.g., n=1) for each of Sequence 1 and Sequence 2, or the network access device may identify different numbers of uplink grants for each of Sequence 1 and Sequence 2. The uplink grants associated with Sequence 1 may be transmitted by the network access device in a random access response message 315 including a Response 1 (directed to UEs that transmitted a random access preamble corresponding to Sequence 1) and a Response 2 (directed to UEs that transmitted a random access preamble corresponding to Sequence 2). Alternatively, the uplink grants corresponding to Sequence 1 and Sequence 2 may be transmitted in different random access response messages.

Each uplink grant included in the random access response message(s) transmitted by the network access device may be associated with a different transmission resource, so that when each of UE A, UE B, and UE C selects a different uplink grant for transmitting a first scheduled UL transmission, the scheduled UL transmissions are transmitted using different transmission resources and do not collide. In some examples, the different transmission resources associated with the different uplink grants may include at least one of different transmission times, or different transmission frequencies, or different scrambling codes, or different channelization codes, or different beam indices, or different UE IDs, or combinations thereof. FIG. 3 shows an example in which different uplink grants may be associated with different time resources and/or frequency resources.

At 320, each of UE A, UE B, and UE C may select an uplink grant associated with the preamble sequence on which its random access preamble was based. In some examples, the uplink grants may be randomly selected by the UEs. By way of example, FIG. 3 shows UE A having selected Grant 1_1 (at 320-a), UE B having selected Grant 1_n (at 320-b), and UE C having selected Grant 2_2 (at 320-c). Because UE A and UE B selected different uplink grants associated with different transmission resources, their scheduled UL transmissions (e.g., at 220 of FIG. 2) will not collide. Additionally or alternatively, the scheduled UL transmission of UE C will not collide with the scheduled UL transmissions of UE A and UE B (e.g., at 220) because its schedule UL transmission is transmitted using different transmission resources that differ from the transmission resources used by UE A and UE B.

In some examples, the timing advance (TA) used for the uplink grants associated with Sequence 1 may differ from the TA used for the uplink grants associated with Sequence 2 (e.g., TA1 may be associated with Sequence 1, and TA2 may be associated with Sequence 2), but the same TA (e.g., TA1) may be used for the uplink grants associated with Sequence 1, and the same TA (e.g., TA2) may be used for the uplink grants associated with Sequence 2. Alternatively, the same TA may be used for both the uplink grants associated with Sequence 1 and the uplink grants associated with Sequence 2, or different TAs may be used for different uplink grants associated with Sequence 1, or different TAs may be used for different uplink grants associated with Sequence 2.

In some examples example, two different uplink grants that are associated with a same preamble sequence may be associated with the same time and frequency resources, but different scrambling codes. In these examples, a network access device may distinguish the scheduled UL transmissions of two different UEs, which UEs respectively use the two different uplink grants for their scheduled UL transmissions (e.g., at 220 of FIG. 2), based on the different scrambling codes associated with the scheduled UL transmissions.

Figure 4:
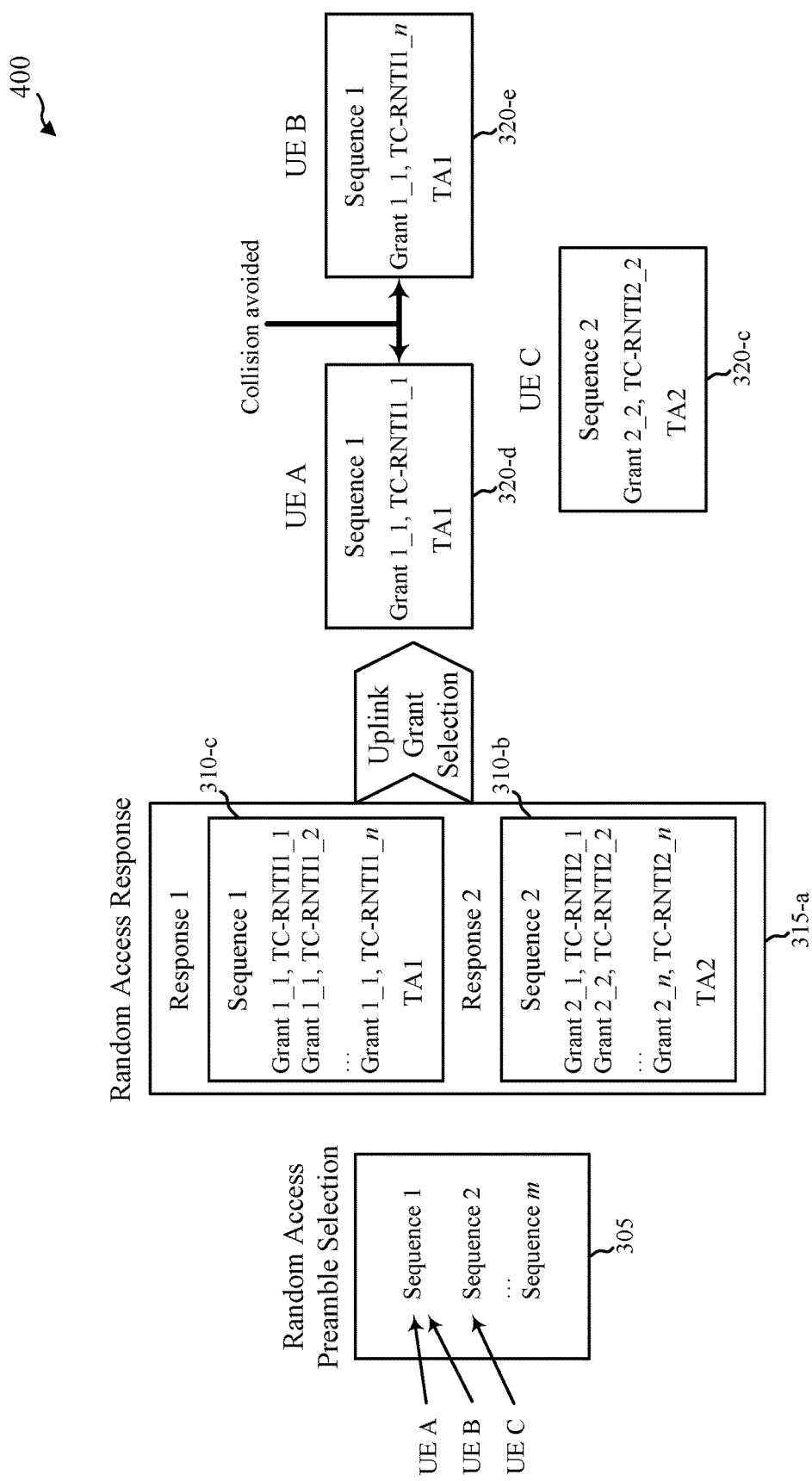
FIG. 4 shows examples of random access preamble selections and uplink grant selections made by a plurality of UEs when performing respective random access procedures at the same time, in accordance with one or more aspects of the present disclosure.

As another example, two different uplink grants may be associated with all of the same transmission resources but for UE IDs (e.g., the two different uplink grants may be associated with different TC-RNTIs, as shown in the uplink grants 310-c of Response 1 of the random access response message 315-a shown in the selections 400 of FIG. 4). In these examples, two different UEs may randomly select two different uplink grants associated with a same preamble sequence (e.g., UE A may select a first uplink grant (Grant 1_1, TC-RNTI1_1) at 320-d, and UE B may select a second uplink grant (Grant 1_1, TC-RNTI1_n) at 320-e), and each UE may transmit a respective scheduled UL transmission using its selected uplink grant. A network access device may distinguish the scheduled UL transmissions of the UEs (e.g., the scheduled UL transmissions of UE A and UE B) based at least in part on the different TC-RNTIs associated with the scheduled UL transmissions. In some examples, the network access device may use interference cancellation to cancel the interference that one or more scheduled UL transmissions impart on another scheduled UL transmission.

In some examples, a network access device (e.g., a base station 105 described with reference to FIG. 1, or the network access device 205 described with reference to FIG. 2) may not be able to determine one or more aspects of a UE from the transmission of a random access preamble and/or first scheduled UL transmission received from the UE. For example, the network access device 205 may not be aware of a service used by the UE, a service requirement of the UE, a transmission need of the UE, a capability of the UE, etc. A network access device's inability to determine some aspects of a UE may limit the network access device's ability to tailor a response to the UE. For example, the network access device may not communicate with the UE using a modulation and coding scheme (MCS) or rank tailored to the UE, or the network access device may not provide the UE with an uplink grant tailored to the UE.

In some examples, a service requirement of a UE may include a QoS requirement of the UE (e.g., a QoS requirement of a service used by the UE), an access priority of the UE (e.g., an access priority of a service used by the UE), etc. In some examples, a transmission need of the UE may be based at least in part on an amount of data in a transmit buffer of the UE. In some examples, a capability of the UE may include a maximum channel bandwidth supported by the UE, which maximum channel bandwidth may be greater than, equal to, or less than the maximum channel bandwidth that a network access device or other network node may provide the UE. In some examples, a capability of the UE may include a feature set (e.g., one or more features) supported by the UE.

In some examples, a service requirement of a UE may include different slices supported by the UE. In some examples, different slices correspond to different services offered by the UE. In some examples, different slices correspond to different services supported by the network supported by the UE. In some examples, different slices correspond to different network slices. In some examples, a physical network may be partitioned into multiple virtual networks (i.e., different slices) allowing a subscriber to offer optimal support for different types of services.

To enable a network access device to identify one or more aspects of a UE, the network access device (or other network node) may associate at least two of the uplink grants associated with a preamble sequence with different feature sets (with each feature set including at least one feature), or with different maximum channel bandwidths, or with different payload sizes, or with different sets of (one or more) services, or with different service requirements, or with different QoS profiles, or with different access priorities, or with combinations thereof.

Upon receiving a random access message including uplink grants associated with potential aspects of a UE, the UE may select an uplink grant for transmission of a first scheduled UL transmission based at least in part on a service used by the UE, or a service requirement of the UE, or a QoS requirement of the UE, or an access priority of the UE, or different slices, or an amount of data in a transmit buffer of the UE, or a maximum channel bandwidth supported by the UE, or a feature set supported by the UE, or combinations thereof.

Upon receiving a scheduled UL transmission from a UE, on a transmission resource associated with an uplink grant, a network access device may identify at least one aspect of the UE based at least in part on the transmission resource on which transmission is received.

Figure 5:
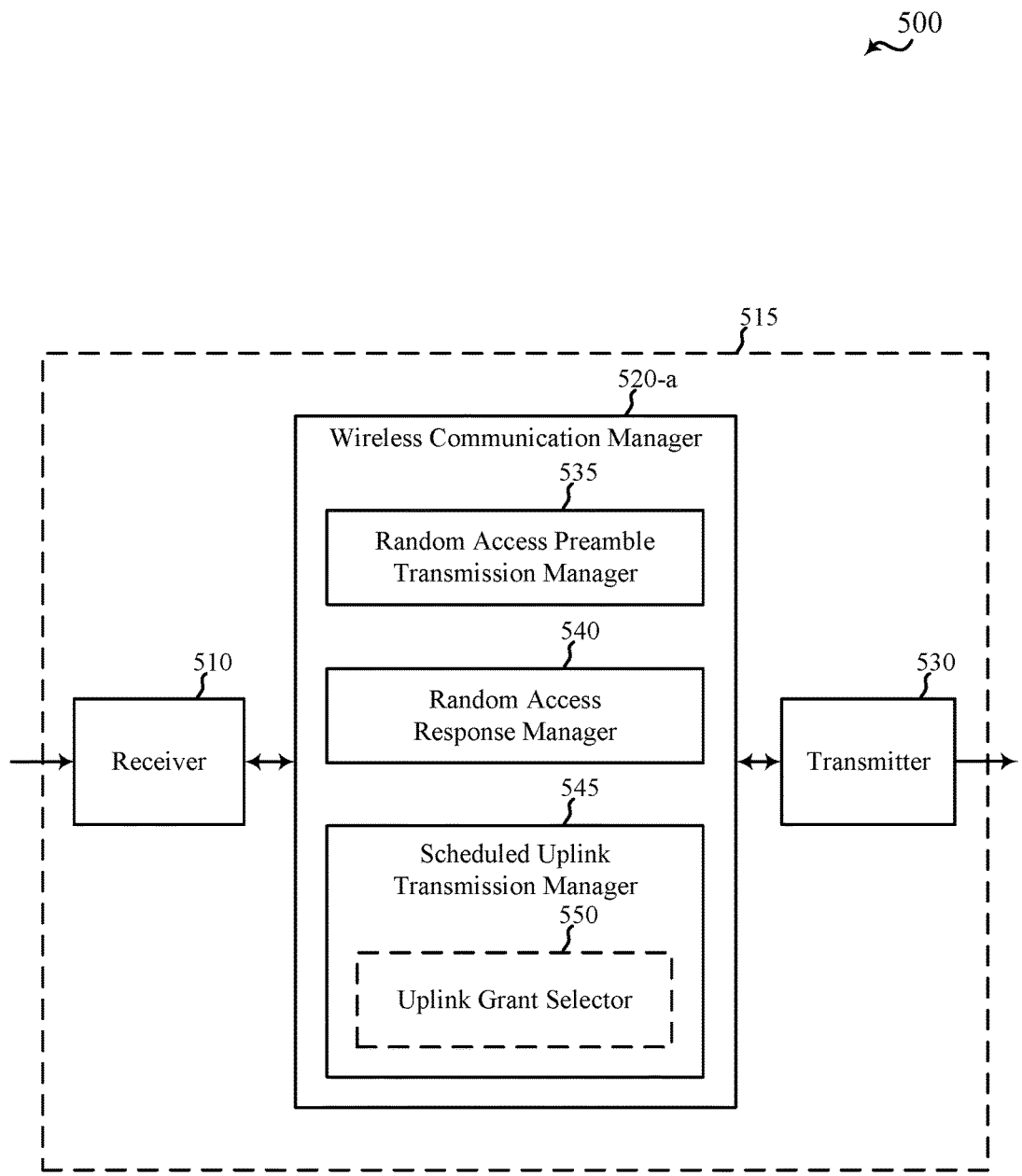
FIG. 5 shows a block diagram of an apparatus for use in wireless communication, in accordance with one or more aspects of the present disclosure.

FIG. 5 shows a block diagram 500 of an apparatus 515 for use in wireless communication, in accordance with one or more aspects of the present disclosure. The apparatus 515 may be an example of aspects of one or more of the UEs 115 described with reference to FIG. 1 or 2. The apparatus 515 may also be or include a processor. The apparatus 515 may include a receiver 510, a wireless communication manager 520-a, or a transmitter 530. Each of these components may be in communication with each other.

The components of the apparatus 515 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In some other examples, other types of integrated circuits may be used (e.g., Structured/Platform ASICs, Field Programmable Gate Arrays (FPGAs), a System-on-Chip (SoC), and/or other types of Semi-Custom ICs), which may be programmed in any manner known in the art. The functions of each component may also be implemented, in whole or in part, with instructions embodied in a memory, formatted to be executed by one or more general or application-specific processors.

In some examples, the receiver 510 may include at least one radio frequency (RF) receiver, such as at least one RF receiver operable to receive transmissions over one or more radio frequency spectrum bands. In some examples, the one or more radio frequency spectrum bands may be used for LTE/LTE-A communications, as described, for example, with reference to FIG. 1, 2, 3, or 4. The receiver 510 may be used to receive various types of data or control signals (i.e., transmissions) over one or more communication links of a wireless communication system, such as one or more communication links of the wireless communication system 100 described with reference to FIG. 1.

In some examples, the transmitter 530 may include at least one RF transmitter, such as at least one RF transmitter operable to transmit over one or more radio frequency spectrum bands. In some examples, the one or more radio frequency spectrum bands may be used for LTE/LTE-A communications, as described, for example, with reference to FIG. 1, 2, 3, or 4. The transmitter 530 may be used to transmit various types of data or control signals (i.e., transmissions) over one or more communication links of a wireless communication system, such as one or more communication links of the wireless communication system 100 described with reference to FIG. 1.

In some examples, the wireless communication manager 520-a may be used to manage one or more aspects of wireless communication for the apparatus 515. In some examples, part of the wireless communication manager 520-a may be incorporated into or shared with the receiver 510 or the transmitter 530. In some examples, the wireless communication manager 520-a may be an example of aspects of the wireless communication manager 520 described with reference to FIG. 1. In some examples, the wireless communication manager 520-a may include a random access preamble transmission manager 535, a random access response manager 540, or a scheduled uplink transmission manager 545. The scheduled uplink transmission manager 545 may optionally include an uplink grant selector 550.

The random access preamble transmission manager 535 may be used to transmitting a random access preamble.

The random access response manager 540 may be used to receive a random access response message that includes a plurality of uplink grants associated with the random access preamble. Each uplink grant in the plurality of uplink grants may be associated with a different transmission resource. In some examples, a first transmission resource associated with a first uplink grant and a second transmission resource associated with a second uplink grant may include at least one of: different transmission times, or different transmission frequencies, or different scrambling codes, or different channelization codes, or different beam indices, or different UE IDs, or combinations thereof.

The uplink grant selector 550 may be used to select an uplink grant from the plurality of uplink grants. In some examples, selecting the uplink grant may include randomly selecting the uplink grant from the plurality of uplink grants.

The scheduled uplink transmission manager 545 may be used to transmit using the selected uplink grant.

Figure 6:
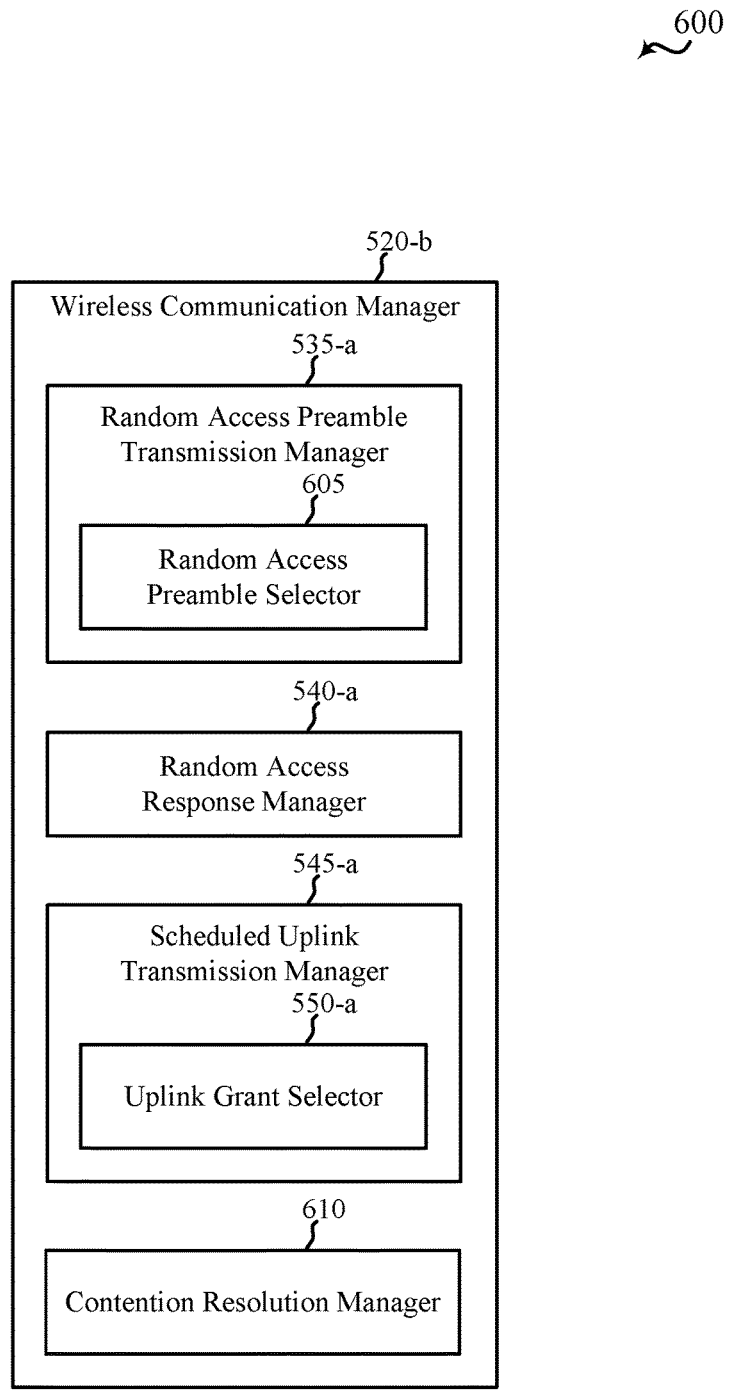
FIG. 6 shows a block diagram of a wireless communication manager for use in wireless communication, in accordance with one or more aspects of the present disclosure.

FIG. 6 shows a block diagram 600 of a wireless communication manager 520-*b* for use in wireless communication, in accordance with one or more aspects of the present disclosure. The wireless communication manager 520-*b* may be an example of aspects of the wireless communication manager 520 described with reference to FIG. 1 or 5.

The components of the wireless communication manager 520-*b* may, individually or collectively, be implemented using one or more ASICs adapted to perform some or all of the applicable functions in hardware. Alternatively, the functions may be performed by one or more other processing units (or cores), on one or more integrated circuits. In some other examples, other types of integrated circuits may be used (e.g., Structured/Platform ASICs, FPGAs, a SoC, and/or other types of Semi-Custom ICs), which may be programmed in any manner known in the art. The functions of each component may also be implemented, in whole or in part, with instructions embodied in a memory, formatted to be executed by one or more general or application-specific processors.

In some examples, the wireless communication manager 520-*b* may be used to manage one or more aspects of wireless communication for a UE or apparatus, such as one of the UEs 115 or apparatuses 515 described with reference to FIG. 1, 2, or 5. In some examples, part of the wireless communication manager 520-*b* may be incorporated into or shared with a receiver or a transmitter (e.g., the receiver 510 or the transmitter 530 described with reference to FIG. 5). In some examples, the wireless communication manager 520-*b* may include a random access preamble transmission manager 535-*a*, a random access response manager 540-*a*, a scheduled uplink transmission manager 545-*a*, or a contention resolution manager 610. The random access preamble transmission manager 535-*a* may include a random access preamble selector 605. The scheduled uplink transmission manager 545-*a* may optionally include an uplink grant selector 550-*a*.

The random access preamble transmission manager 535-*a* may be used to transmitting a random access preamble. The random access preamble selector 605 may be used to select the random access preamble from a plurality of preamble sequences (e.g., 64 preamble sequences).

The random access response manager 540-*a* may be used to receive a random access response message that includes a plurality of uplink grants associated with the random access preamble. Each uplink grant in the plurality of uplink grants may be associated with a different transmission resource. In some examples, a first transmission resource associated with a first uplink grant and a second transmission resource associated with a second uplink grant may include at least one of: different transmission times, or different transmission frequencies, or different scrambling codes, or different channelization codes, or different beam indices, or different UE IDs, or combinations thereof.

The uplink grant selector 550-*a* may be used to select an uplink grant from the plurality of uplink grants. In some examples, selecting the uplink grant may include randomly selecting the uplink grant from the plurality of uplink grants.

In some examples, the random access response manager 540-*a* may receive at least two uplink grants associated with different feature sets, and the uplink grant selector 550-*a* may select an uplink grant based at least in part on a feature set supported by the UE that includes the wireless communication manager 520-*b*. In some examples, the random access response manager 540-*a* may receive at least two uplink grants associated with different maximum channel bandwidths, and the uplink grant selector 550-*a* may select an uplink grant based at least in part on a maximum channel bandwidth supported by the UE that includes the wireless communication manager 520-*b*. In some examples, the random access response manager 540-*a* may receive at least two uplink grants associated with different payload sizes, and the uplink grant selector 550-*a* may select an uplink grant based at least in part on an amount of data in a transmit buffer of the UE that includes the wireless communication manager 520-*b*. In some examples, the random access response manager 540-*a* may receive at least two uplink grants associated with at least one of different sets of services, or different service requirements, or different QoS profiles, or different access priorities, or different slices, or combinations thereof, and the uplink grant selector 550-*a* may select an uplink grant based at least in part on a service used by the UE that includes the wireless communication manager 520-*b*, or a service requirement of the UE, or a QoS requirement of the UE, or an access priority of the UE, or different slices, or combinations thereof.

The scheduled uplink transmission manager 545-*a* may be used to transmit using the selected uplink grant. The contention resolution manager 610 may be used to receive a contention resolution message.

Figure 7:
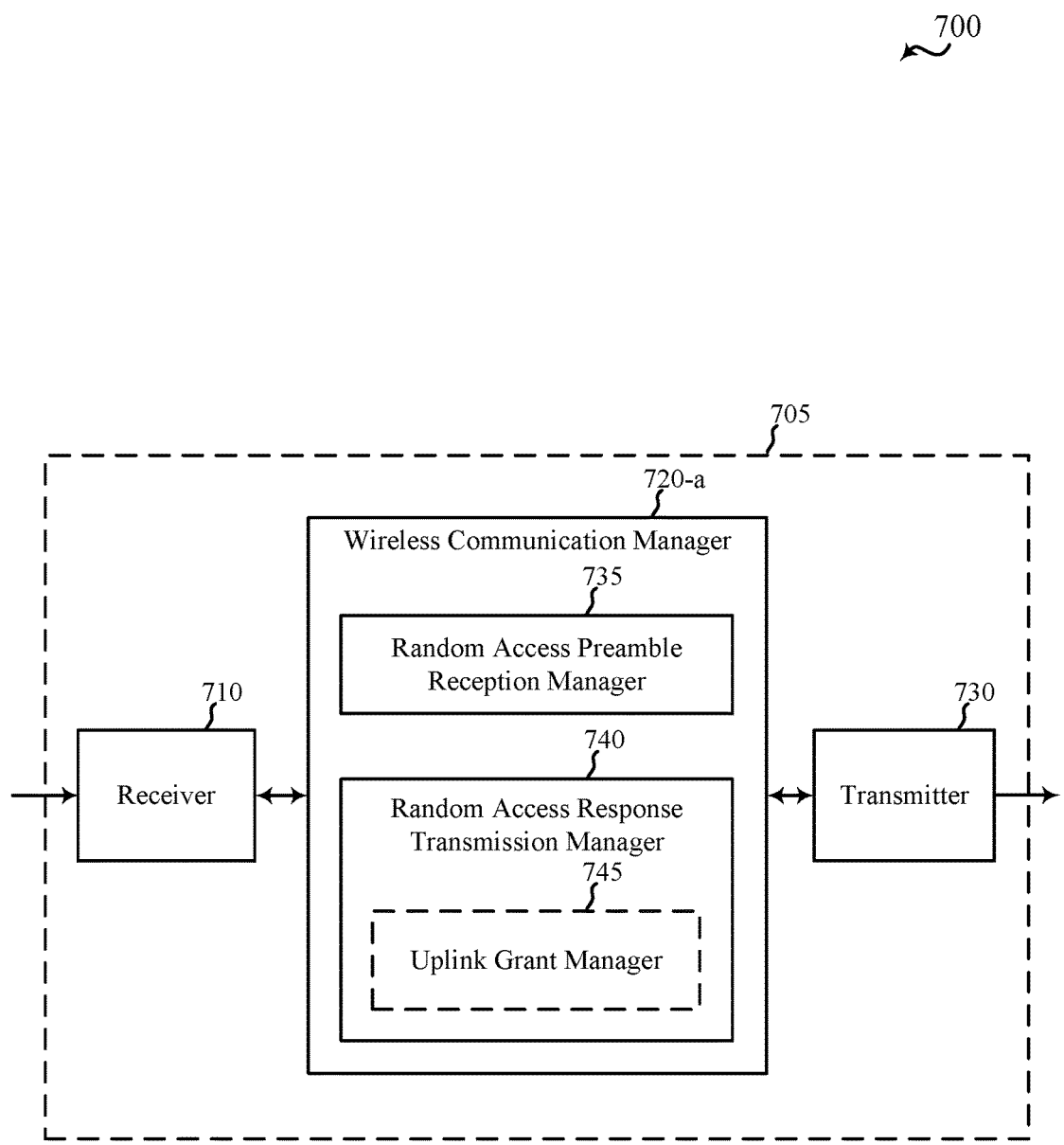
FIG. 7 shows a block diagram of an apparatus for use in wireless communication, in accordance with one or more aspects of the present disclosure.

FIG. 7 shows a block diagram 700 of an apparatus 705 for use in wireless communication, in accordance with one or more aspects of the present disclosure. The apparatus 705 may be an example of aspects of one or more of the base stations 105 or network access devices 205 described with reference to FIG. 1 or 2. The apparatus 705 may also be or include a processor. The apparatus 705 may include a receiver 710, a wireless communication manager 720-*a*, or a transmitter 730. Each of these components may be in communication with each other.

The components of the apparatus 705 may, individually or collectively, be implemented using one or more ASICs adapted to perform some or all of the applicable functions in hardware. Alternatively, the functions may be performed by one or more other processing units (or cores), on one or more integrated circuits. In some other examples, other types of integrated circuits may be used (e.g., Structured/Platform ASICs, FPGAs, a SoC, and/or other types of Semi-Custom ICs), which may be programmed in any manner known in the art. The functions of each component may also be implemented, in whole or in part, with instructions embodied in a memory, formatted to be executed by one or more general or application-specific processors.

In some examples, the receiver 710 may include at least one RF receiver, such as at least one RF receiver operable to receive transmissions over one or more radio frequency spectrum bands. In some examples, the one or more radio frequency spectrum bands may be used for LTE/LTE-A communications, as described, for example, with reference to FIG. 1, 2, 3, or 4. The receiver 710 may be used to receive various types of data or control signals (i.e., transmissions) over one or more communication links of a wireless communication system, such as one or more communication links of the wireless communication system 100 described with reference to FIG. 1.

In some examples, the transmitter 730 may include at least one RF transmitter, such as at least one RF transmitter operable to transmit over one or more radio frequency spectrum bands. In some examples, the one or more radio frequency spectrum bands may be used for LTE/LTE-A communications, as described, for example, with reference to FIG. 1, 2, 3, or 4. The transmitter 730 may be used to transmit various types of data or control signals (i.e., transmissions) over one or more communication links of a wireless communication system, such as one or more communication links of the wireless communication system 100 described with reference to FIG. 1.

In some examples, the wireless communication manager 720-a may be used to manage one or more aspects of wireless communication for the apparatus 705. In some examples, part of the wireless communication manager 720-a may be incorporated into or shared with the receiver 710 or the transmitter 730. In some examples, the wireless communication manager 720-a may be an example of aspects of the wireless communication manager 720 described with reference to FIG. 1. In some examples, the wireless communication manager 720-a may include a random access preamble reception manager 735 or a random access response transmission manager 740. The random access response transmission manager 740 may optionally include an uplink grant manager 745.

The random access preamble reception manager 735 may be used to receive a random access preamble.

The random access response transmission manager 740 may be used to transmit a random access response message that includes a plurality of uplink grants associated with the random access preamble. Each uplink grant in the plurality of uplink grants may be associated with a different transmission resource. In some examples, a first transmission resource associated with a first uplink grant and a second transmission resource associated with a second uplink grant may include at least one of different transmission times, or different transmission frequencies, or different scrambling codes, or different channelization codes, or different beam indices, or different UE IDs, or combinations thereof.

The uplink grant manager 745 may be used to identify a number of uplink grants associated with the random access preamble received using the random access preamble reception manager 735, for inclusion in the random access response message transmitted using the random access response transmission manager 740. The number of uplink grants may be identified based at least in part on a network load, or an estimate of a number of collisions between transmissions of the random access preamble by different UEs, or an estimate of a number of collisions between transmissions by different UEs using a same uplink grant included in a random access response message, or a number of channel elements in a receiver of the network access device, or a number of available transmission resources, or a time of receipt of the random access preamble, or combinations thereof.

Figure 8:
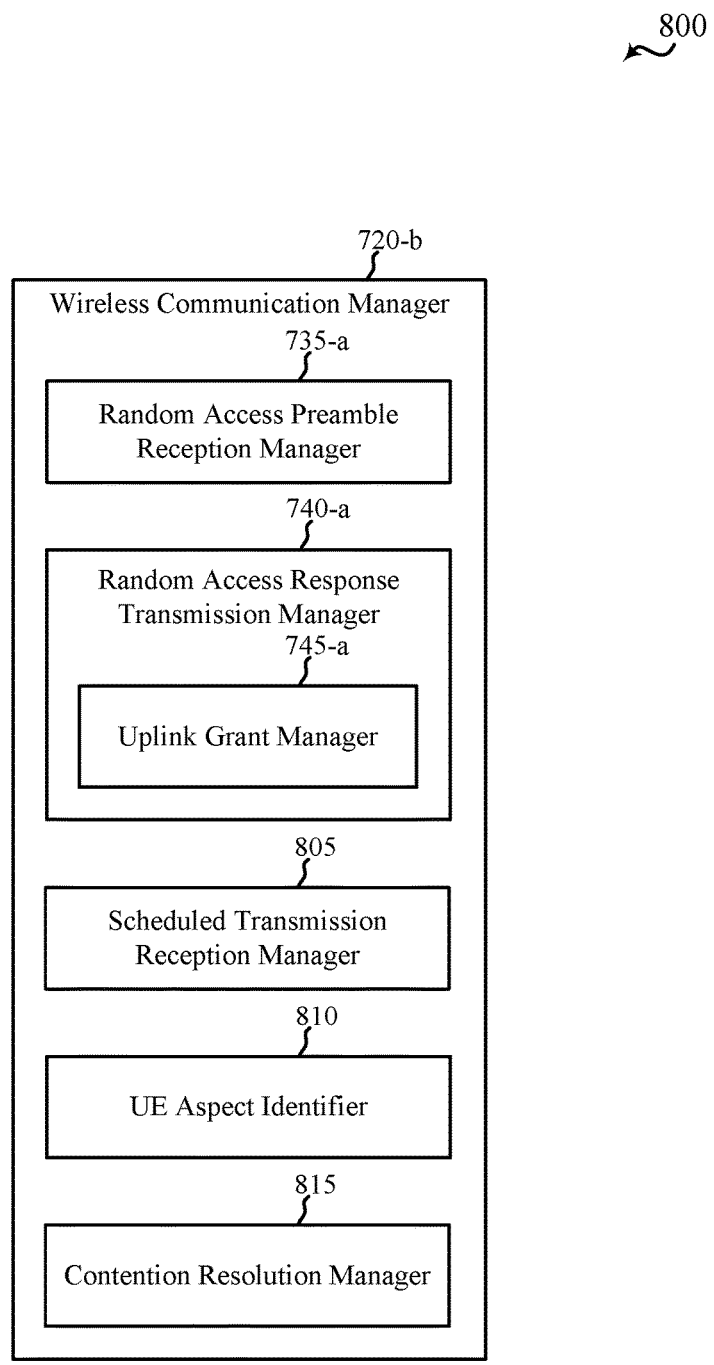
FIG. 8 shows a block diagram of a wireless communication manager for use in wireless communication, in accordance with one or more aspects of the present disclosure.

FIG. 8 shows a block diagram 800 of a wireless communication manager 720-b for use in wireless communication, in accordance with one or more aspects of the present disclosure. The wireless communication manager 720-b may be an example of aspects of the wireless communication manager 720 described with reference to FIG. 1 or 7.

The components of the wireless communication manager 720-b may, individually or collectively, be implemented using one or more ASICs adapted to perform some or all of the applicable functions in hardware. Alternatively, the functions may be performed by one or more other processing units (or cores), on one or more integrated circuits. In some other examples, other types of integrated circuits may be used (e.g., Structured/Platform ASICs, FPGAs, a SoC, and/or other types of Semi-Custom ICs), which may be programmed in any manner known in the art. The functions of each component may also be implemented, in whole or in part, with instructions embodied in a memory, formatted to be executed by one or more general or application-specific processors.

In some examples, the wireless communication manager 720-b may be used to manage one or more aspects of wireless communication for a network access device or apparatus, such as one of the base stations 105, network access devices 205, or apparatuses 705 described with reference to FIG. 1, 2, or 7. In some examples, part of the wireless communication manager 720-b may be incorporated into or shared with a receiver or a transmitter (e.g., the receiver 710 or the transmitter 730 described with reference to FIG. 7). In some examples, the wireless communication manager 720-b may include a random access preamble reception manager 735-a, a random access response transmission manager 740-a, a scheduled transmission reception manager 805, a UE aspect identifier 810, or a contention resolution manager 815. The random access response transmission manager 740-a may optionally include an uplink grant manager 745-a.

The random access preamble reception manager 735-a may be used to receive a random access preamble.

The random access response transmission manager 740-a may be used to transmit a random access response message that includes a number of uplink grants associated with a random access preamble. Each uplink grant in the plurality of uplink grants may be associated with a different transmission resource. In some examples, a first transmission resource associated with a first uplink grant and a second transmission resource associated with a second uplink grant may include at least one of different transmission times, or different transmission frequencies, or different scrambling codes, or different channelization codes, or different beam indices, or different UE IDs, or combinations thereof.

The uplink grant manager 745-a may be used to identify a number of uplink grants associated with a random access preamble received using the random access preamble reception manager 735-a, for inclusion in a random access response message transmitted using the random access response transmission manager 740-a. Alternatively or additionally, the uplink grant manager 745-a may identify a number of uplink grants to associate with the random access preamble based at least in part on a time-variable parameter. In these latter examples, the identified number of uplink grants may include at least one uplink grant (e.g., a single uplink grant or a plurality of uplink grants) associated with at least one transmission resource. The number of uplink grants may be identified based at least in part on a network load, or an estimate of a number of collisions between transmissions of the random access preamble by different UEs, or an estimate of a number of collisions between transmissions by different UEs using a same uplink grant included in a random access response message, or a number of channel elements in a receiver of the network access device, or a number of available transmission resources, or a time of receipt of the random access preamble, or combinations thereof. In some examples, the uplink grant manager 745-a may associate at least two uplink grants with different feature sets, or different maximum channel bandwidths, or different payload sizes, or different sets of services, or different service requirements, or different QoS profiles, or different access priorities, or different slices, or combinations thereof.

The scheduled transmission reception manager 805 may be used to receive a transmission, from a UE, on a transmission resource associated with an uplink grant in the plurality of uplink grants. In some examples, the scheduled transmission reception manager 805 may receive transmissions from at least two UEs, on transmission resources associated with at least two uplink grants in the plurality of uplink grants.

The UE aspect identifier 810 may be used to identify, based at least in part on the transmission resource on which the transmission is received, at least one aspect of a UE. In some examples, the at least one aspect of the UE may include a feature set supported by the UE, or a channel bandwidth supported by the UE, or an amount of data in a transmit buffer of the UE, or a service used by the UE, or a service requirement of the UE, or a QoS requirement of the UE, or an access priority of the UE, or different slices, or combinations thereof.

The contention resolution manager 815 may be used to transmit a contention resolution to the UE.

Figure 9:
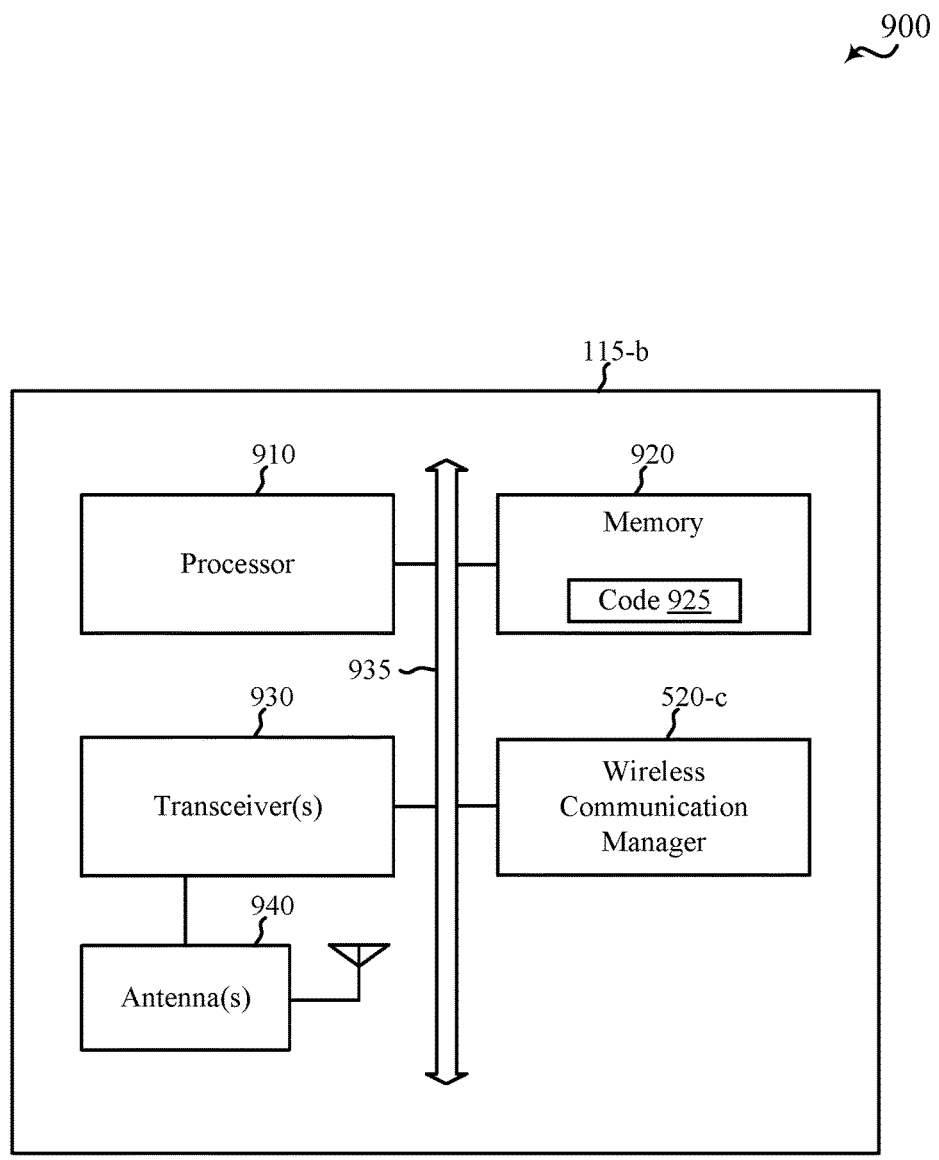
FIG. 9 shows a block diagram of a UE for use in wireless communication, in accordance with one or more aspects of the present disclosure.

FIG. 9 shows a block diagram 900 of a UE 115-*b* for use in wireless communication, in accordance with one or more aspects of the present disclosure. The UE 115-*b* may be included or be part of a personal computer (e.g., a laptop computer, a netbook computer, a tablet computer, etc.), a cellular telephone, a PDA, a DVR, an internet appliance, a gaming console, an e-reader, a vehicle, a home appliance, a lighting or alarm control system, etc. The UE 115-*b* may, in some examples, have an internal power supply (not shown), such as a small battery, to facilitate mobile operation. In some examples, the UE 115-*b* may be an example of aspects of one or more of the UEs 115 described with reference to FIG. 1, or aspects of the apparatus 515 described with reference to FIG. 5. The UE 115-*b* may be configured to implement at least some of the UE or apparatus techniques and functions described with reference to FIG. 1, 2, 3, 4, 5, or 6.

The UE 115-*b* may include a processor 910, a memory 920, at least one transceiver (represented by transceiver(s) 930), at least one antenna (represented by antenna(s) 940), or a wireless communication manager 520-*c*. Each of these components may be in communication with each other, directly or indirectly, over one or more buses 935.

The memory 920 may include random access memory (RAM) or read-only memory (ROM). The memory 920 may store computer-readable, computer-executable code 925 containing instructions that are configured to, when executed, cause the processor 910 to perform various functions described herein related to wireless communication, including, for example, performing a random access procedure. Alternatively, the computer-executable code 925 may not be directly executable by the processor 910 but be configured to cause the UE 115-*b* (e.g., when compiled and executed) to perform various of the functions described herein.

The processor 910 may include an intelligent hardware device, e.g., a central processing unit (CPU), a microcontroller, an ASIC, etc. The processor 910 may process information received through the transceiver(s) 930 or information to be sent to the transceiver(s) 930 for transmission through the antenna(s) 940. The processor 910 may handle, alone or in connection with the wireless communication manager 520-*c*, various aspects of communicating over (or managing communications over) one or more radio frequency spectrum bands.

The transceiver(s) 930 may include a modem configured to modulate packets and provide the modulated packets to the antenna(s) 940 for transmission, and to demodulate packets received from the antenna(s) 940. The transceiver(s) 930 may, in some examples, be implemented as one or more transmitters and one or more separate receivers. The transceiver(s) 930 may support communications in one or more radio frequency spectrum bands. The transceiver(s) 930 may be configured to communicate bi-directionally, via the antenna(s) 940, with one or more of the base stations 105 or network access devices 205 described with reference to FIG. 1 or 2, or the apparatus 705 described with reference to FIG. 7. While the UE 115-*b* may include a single antenna, there may be examples in which the UE 115-*b* may include multiple antennas 940.

The wireless communication manager 520-*c* may be configured to perform or control some or all of the UE or apparatus techniques or functions described with reference to FIG. 1, 2, 3, 4, 5, or 6 related to wireless communication over one or more radio frequency spectrum bands. The wireless communication manager 520-*c*, or portions of it, may include a processor, or some or all of the functions of the wireless communication manager 520-*c* may be performed by the processor 910 or in connection with the processor 910. In some examples, the wireless communication manager 520-*c* may be an example of the wireless communication manager 520 described with reference to FIG. 1, 5, or 6.

Figure 10:
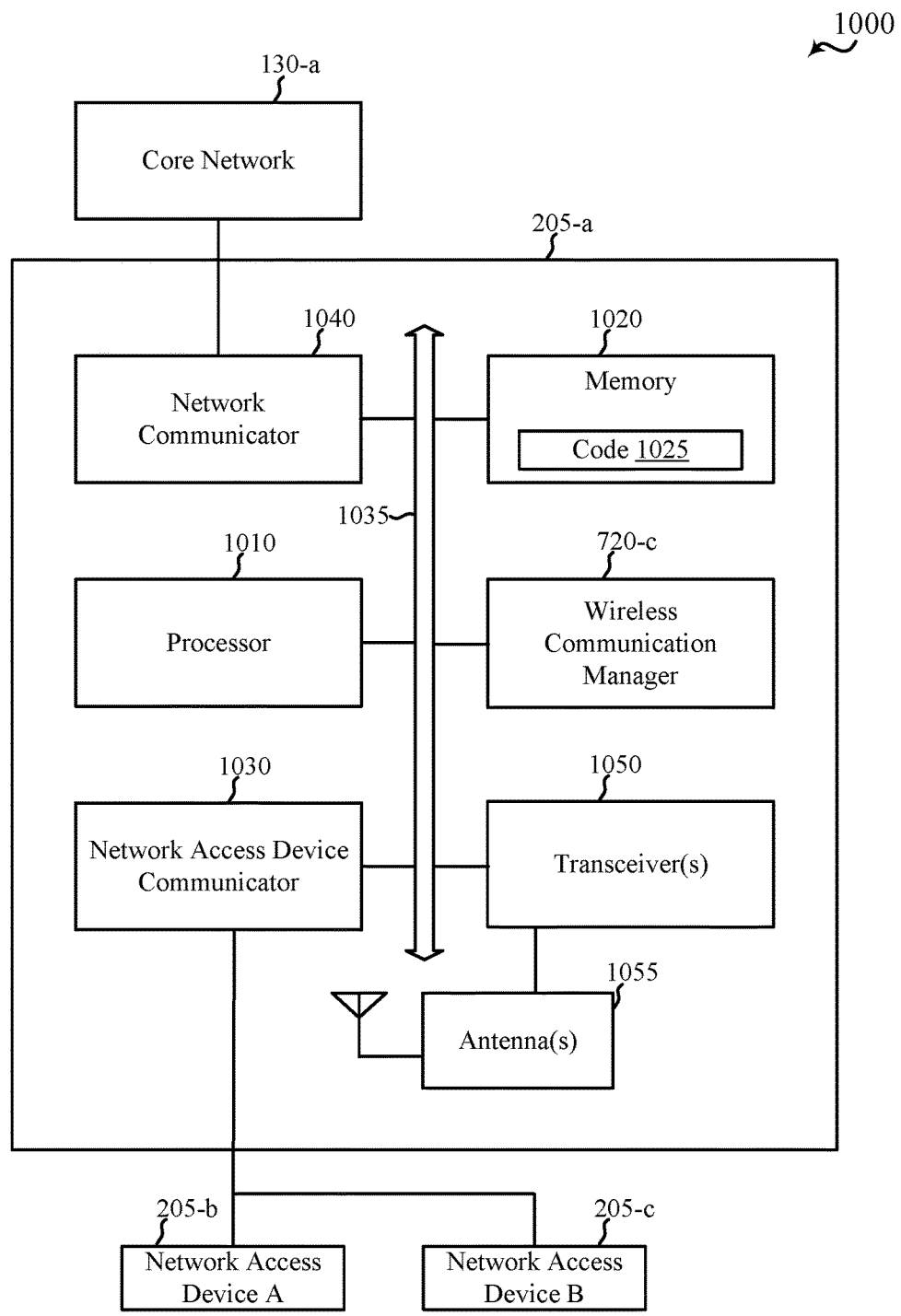
FIG. 10 shows a block diagram of a network access device for use in wireless communication, in accordance with one or more aspects of the present disclosure.

FIG. 10 shows a block diagram 1000 of a network access device 205-*a* for use in wireless communication, in accordance with one or more aspects of the present disclosure. In some examples, the network access device 205-*a* may be an example of one or more aspects of a network access device 205 (e.g., a radio head, a base station 105, an eNB, or an ANC) described with reference to FIG. 1 or 2, or aspects of the apparatus 705 described with reference to FIG. 7. The network access device 205-*a* may be configured to implement or facilitate at least some of the network access device techniques and functions described with reference to FIG. 1, 2, 3, 4, 7, or 8.

The network access device 205-*a* may include a processor 1010, a memory 1020, at least one transceiver (represented by transceiver(s) 1050), at least one antenna (represented by base station antenna(s) 1055), or a wireless communication manager 720-*c*. The network access device 205-*a* may also include one or more of a network access device communicator 1030 or a network communicator 1040. Each of these components may be in communication with each other, directly or indirectly, over one or more buses 1035.

The memory 1020 may include RAM or ROM. The memory 1020 may store computer-readable, computer-executable code 1025 containing instructions that are configured to, when executed, cause the processor 1010 to perform various functions described herein related to wireless communication, including, for example, participating in a random access procedure performed by a UE. Alternatively, the computer-executable code 1025 may not be directly executable by the processor 1010 but be configured to cause the network access device 205-*a* (e.g., when compiled and executed) to perform various of the functions described herein.

The processor 1010 may include an intelligent hardware device, e.g., a CPU, a microcontroller, an ASIC, etc. The processor 1010 may process information received through the transceiver(s) 1050, the network access device communicator 1030, or the network communicator 1040. The processor 1010 may also process information to be sent to the transceiver(s) 1050 for transmission through the antenna(s) 1055, to the network access device communicator 1030, for transmission to one or more other network access devices (e.g., network access device 205-*b* and network access device 205-*c*), or to the network communicator 1040 for transmission to a core network 130-*a*, which may be an example of one or more aspects of the core network 130 described with reference to FIG. 1. The processor 1010 may handle, alone or in connection with the wireless communication manager 720-*c*, various aspects of communicating over (or managing communications over) one or more radio frequency spectrum bands.

The transceiver(s) 1050 may include a modem configured to modulate packets and provide the modulated packets to the antenna(s) 1055 for transmission, and to demodulate packets received from the antenna(s) 1055. The transceiver(s) 1050 may, in some examples, be implemented as one or more transmitters and one or more separate receivers. The transceiver(s) 1050 may support communications in one or more radio frequency spectrum bands. The transceiver(s) 1050 may be configured to communicate bi-directionally, via the antenna(s) 1055, with one or more UEs or apparatuses, such as one of the UEs 115 described with reference to FIG. 1, 2, or 9, or the apparatus 515 described with reference to FIG. 5. The network access device 205-*a* may, for example, include multiple antennas 1055 (e.g., an antenna array). The network access device 205-*a* may communicate with the core network 130-*a* through the network communicator 1040. The network access device 205-*a* may also communicate with other network access devices, such as the network access device 205-*b* and the network access device 205-*c*, using the network access device communicator 1030.

The wireless communication manager 720-*c* may be configured to perform or control some or all of the network access device or apparatus techniques or functions described with reference to FIG. 1, 2, 3, 4, 7, or 8 related to wireless communication over one or more radio frequency spectrum bands. The wireless communication manager 720-*c*, or portions of it, may include a processor, or some or all of the functions of the wireless communication manager 720-*c* may be performed by the processor 1010 or in connection with the processor 1010. In some examples, the wireless communication manager 720-*c* may be an example of the wireless communication manager 720 described with reference to FIG. 1, 7, or 8.

Figure 11:
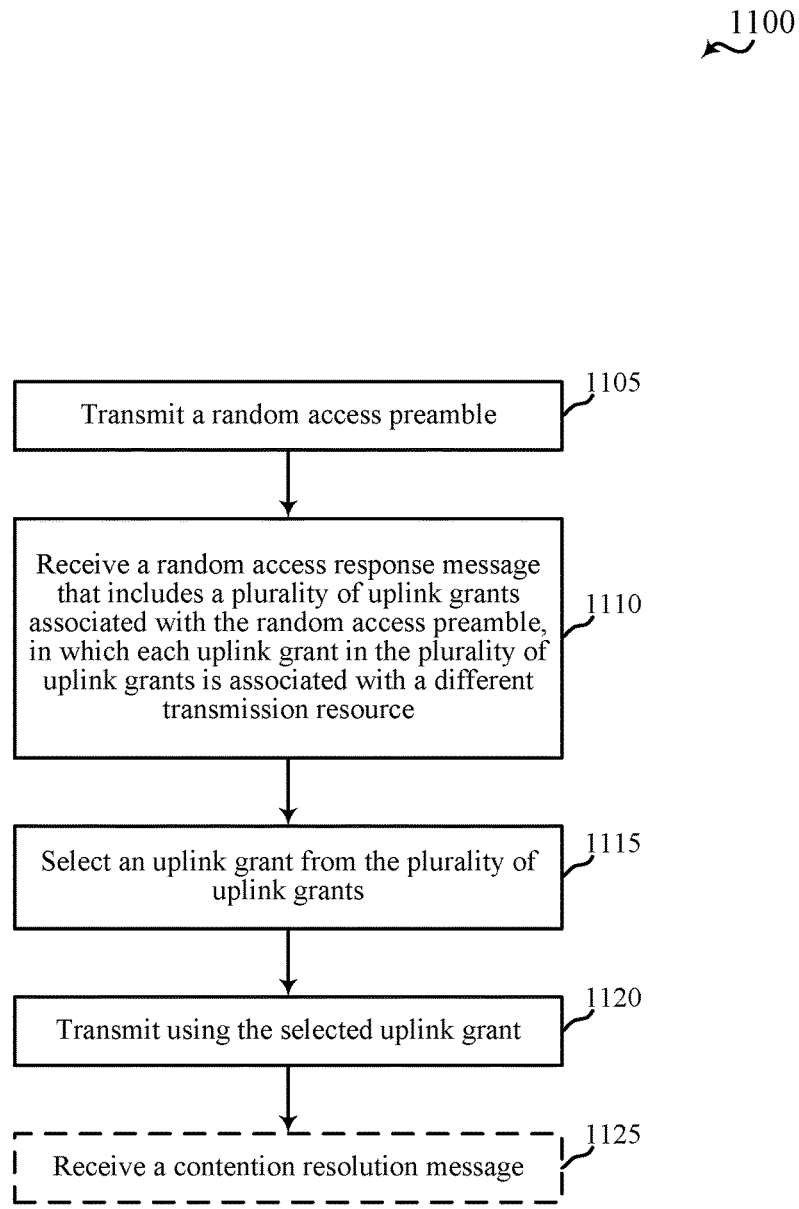
FIG. 11 is a flow chart illustrating an example of a method for wireless communication at a UE, in accordance with one or more aspects of the present disclosure.

FIG. 11 is a flow chart illustrating an example of a method 1100 for wireless communication at a UE, in accordance with one or more aspects of the present disclosure. For clarity, the method 1100 is described below with reference to aspects of one or more of the UE 115 described with reference to FIG. 1, 2, or 9, aspects of the apparatus 515 described with reference to FIG. 5, or aspects of one or more of the wireless communication managers 520 described with reference to FIG. 1, 5, 6, or 9. In some examples, a UE may execute one or more sets of codes to control the functional elements of the UE to perform the functions described below. Additionally or alternatively, the UE may perform one or more of the functions described below using special-purpose hardware.

At block 1105, the method 1100 may include transmitting a random access preamble. The operation(s) at block 1105 may be performed using the wireless communication manager 520 described with reference to FIG. 1, 5, 6, or 9, or the random access preamble transmission manager 535 described with reference to FIG. 5 or 6.

At block 1110, the method 1100 may include receiving a random access response message that includes a plurality of uplink grants associated with the random access preamble. Each uplink grant in the plurality of uplink grants may be associated with a different transmission resource. In some examples, a first transmission resource associated with a first uplink grant and a second transmission resource associated with a second uplink grant may include at least one of: different transmission times, or different transmission frequencies, or different scrambling codes, or different channelization codes, or different beam indices, or different UE IDs, or combinations thereof. The operation(s) at block 1110 may be performed using the wireless communication manager 520 described with reference to FIG. 1, 5, 6, or 9, or the random access response manager 540 described with reference to FIG. 5 or 6.

At block 1115, the method 1100 may include selecting an uplink grant from the plurality of uplink grants. In some examples, selecting the uplink grant may include randomly selecting the uplink grant from the plurality of uplink grants. The operation(s) at block 1115 may be performed using the wireless communication manager 520 described with reference to FIG. 1, 5, 6, or 9, or the uplink grant selector 550 described with reference to FIG. 5 or 6.

At block 1120, the method 1100 may include transmitting using the selected uplink grant. The operation(s) at block 1120 may be performed using the wireless communication manager 520 described with reference to FIG. 1, 5, 6, or 9, or the scheduled uplink transmission manager 545 described with reference to FIG. 5 or 6.

At block 1125, the method 1100 may optionally include receiving a contention resolution message. The operation(s) at block 1125 may be performed using the wireless communication manager 520 described with reference to FIG. 1, 5, 6, or 9, or the contention resolution manager 610 described with reference to FIG. 6.

In some examples of the method 1100, at least two of the uplink grants may be associated with different feature sets, and the uplink grant selected at block 1115 may be selected based at least in part on a feature set supported by the UE. In some examples, at least two of the uplink grants may be associated with different maximum channel bandwidths, and the uplink grant selected at block 1115 may be selected based at least in part on a maximum channel bandwidth supported by the UE. In some examples, at least two of the uplink grants may be associated with different payload sizes, and the uplink grant selected at block 1115 may be selected based at least in part on an amount of data in a transmit buffer of the UE. In some examples, at least two of the uplink grants may be associated with at least one of different sets of services, or different service requirements, or different QoS profiles, or different access priorities, or different slices, or combinations thereof, and the uplink grant selected at block 1115 may be selected based at least in part on a service used by the UE, or a service requirement of the UE, or a QoS requirement of the UE, or an access priority of the UE, or different slices, or combinations thereof.

Figure 12:
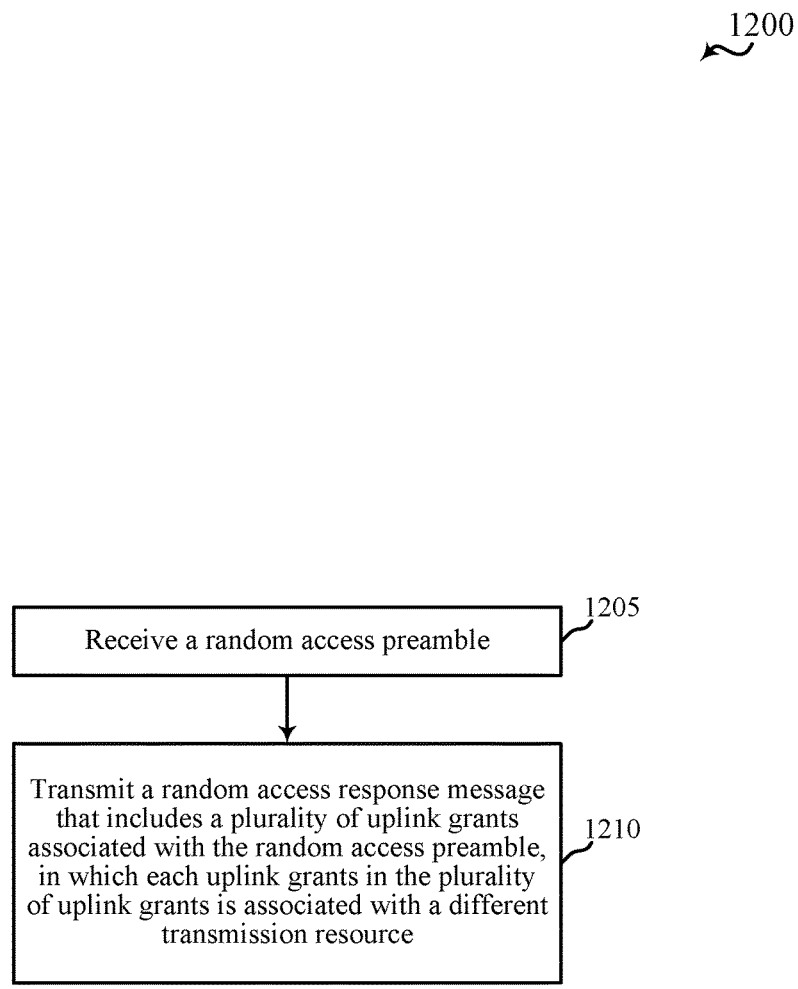
FIG. 12 is a flow chart illustrating an example of a method for wireless communication at a network access device, in accordance with one or more aspects of the present disclosure.

FIG. 12 is a flow chart illustrating an example of a method 1200 for wireless communication at a network access device, in accordance with one or more aspects of the present disclosure. For clarity, the method 1200 is described below with reference to aspects of one or more of the base stations 105 described with reference to FIG. 1, aspects of one of the network access devices 205 described with reference to FIG. 2 or 10, aspects of the apparatus 705 described with reference to FIG. 7, or aspects of one or more of the wireless communication managers 720 described with reference to FIG. 1, 7, 8, or 10. In some examples, a network access device may execute one or more sets of codes to control the functional elements of the network access device to perform the functions described below. Additionally or alternatively, the network access device may perform one or more of the functions described below using special-purpose hardware.

At block 1205, the method 1200 may include receiving a random access preamble. The operation(s) at block 1205 may be performed using the wireless communication manager 720 described with reference to FIG. 1, 7, 8, or 10, or the random access preamble reception manager 735 described with reference to FIG. 7 or 8.

At block 1210, the method 1200 may include transmitting a random access response message that includes a plurality of uplink grants associated with the random access preamble. Each uplink grant in the plurality of uplink grants may be associated with a different transmission resource. In some examples, a first transmission resource associated with a first uplink grant and a second transmission resource associated with a second uplink grant may include at least one of different transmission times, or different transmission frequencies, or different scrambling codes, or different channelization codes, or different beam indices, or different UE IDs, or combinations thereof. The operation(s) at block 1210 may be performed using the wireless communication manager 720 described with reference to FIG. 1, 7, 8, or 10, or the random access response transmission manager 740 described with reference to FIG. 7 or 8.

Figure 13:
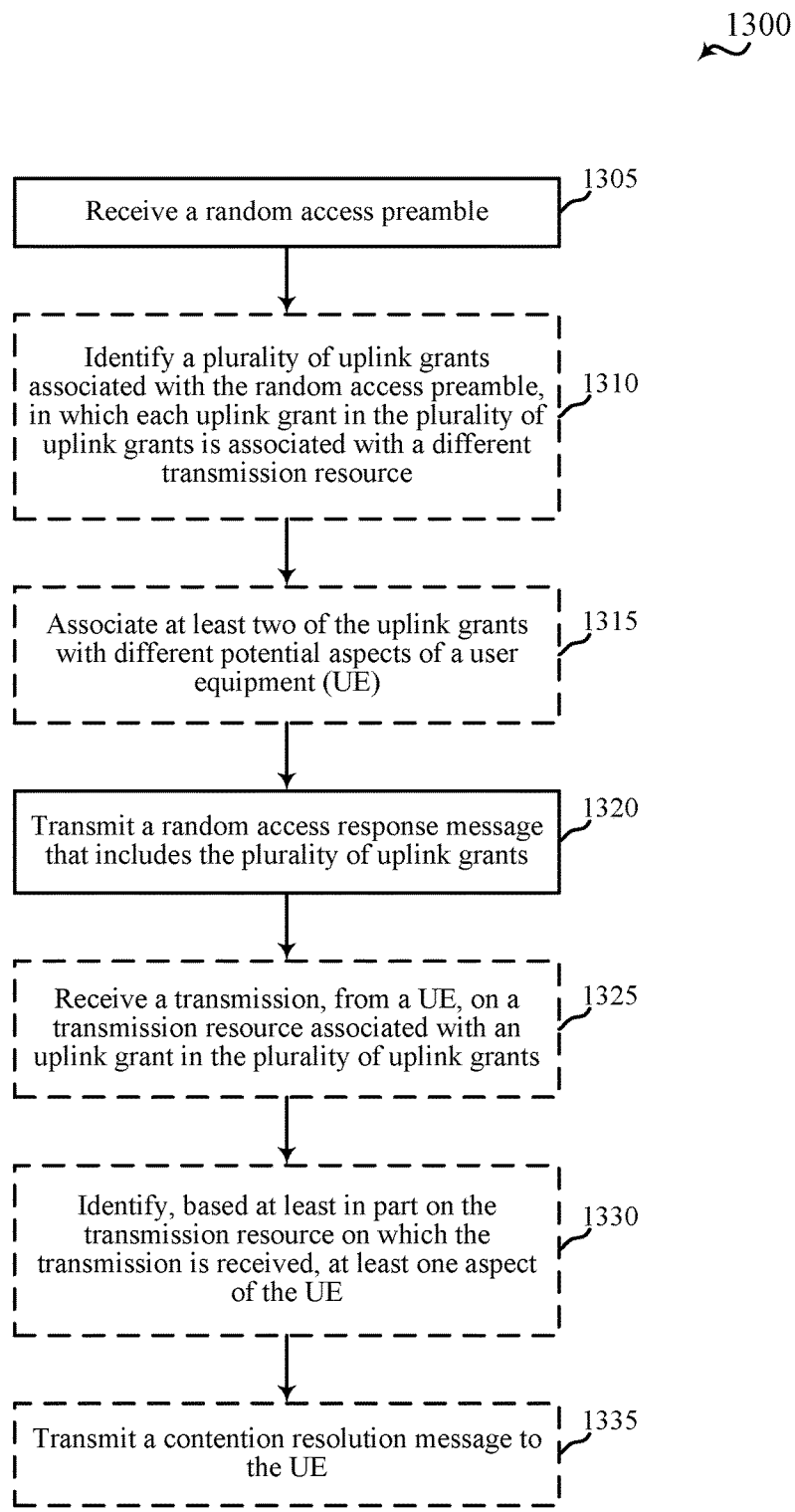
FIG. 13 is a flow chart illustrating an example of a method for wireless communication at a network access device, in accordance with one or more aspects of the present disclosure.

FIG. 13 is a flow chart illustrating an example of a method 1300 for wireless communication at a network access device, in accordance with one or more aspects of the present disclosure. For clarity, the method 1300 is described below with reference to aspects of one or more of the base stations 105 described with reference to FIG. 1, aspects of one or more of the network access devices 205 described with reference to FIG. 2 or 10, aspects of the apparatus 705 described with reference to FIG. 7, or aspects of one or more of the wireless communication managers 720 described with reference to FIG. 1, 7, 8, or 10. In some examples, a network access device may execute one or more sets of codes to control the functional elements of the network access device to perform the functions described below. Additionally or alternatively, the network access device may perform one or more of the functions described below using special-purpose hardware.

At block 1305, the method 1300 may include receiving a random access preamble. The operation(s) at block 1305 may be performed using the wireless communication manager 720 described with reference to FIG. 1, 7, 8, or 10, or the random access preamble reception manager 735 described with reference to FIG. 7 or 8.

At block 1310, the method 1300 may optionally include identifying a number of uplink grants associated with the random access preamble. Each uplink grant in the number of uplink grants may be associated with a different transmission resource. In some examples, a first transmission resource associated with a first uplink grant and a second transmission resource associated with a second uplink grant may include at least one of different transmission times, or different transmission frequencies, or different scrambling codes, or different channelization codes, or different beam indices, or different UE IDs, or combinations thereof. The number of uplink grants may be identified based at least in part on a network load, or an estimate of a number of collisions between transmissions of the random access preamble by different UEs, or an estimate of a number of collisions between transmissions by different UEs using a same uplink grant included in a random access response message, or a number of channel elements in a receiver of the network access device, or a number of available transmission resources, or a time of receipt of the random access preamble, or combinations thereof. The operation(s) at block 1310 may be performed using the wireless communication manager 720 described with reference to FIG. 1, 7, 8, or 10, or the uplink grant manager 745 described with reference to FIG. 7 or 8.

At block 1315, the method 1300 may optionally include associating at least two of a plurality of uplink grants (including the number of uplink grants identified at block 1310) with different feature sets, or different maximum channel bandwidths, or different payload sizes, or different sets of services, or different service requirements, or different QoS profiles, or different access priorities, or different slices, or combinations thereof. The operation(s) at block 1315 may be performed using the wireless communication manager 720 described with reference to FIG. 1, 7, 8, or 10, or the uplink grant manager 745 described with reference to FIG. 7 or 8.

At block 1320, the method 1300 may include transmitting a random access response message that includes the plurality of uplink grants. The operation(s) at block 1320 may be performed using the wireless communication manager 720 described with reference to FIG. 1, 7, 8, or 10, or the random access response transmission manager 740 described with reference to FIG. 7 or 8.

At block 1325, the method 1300 may optionally include receiving a transmission, from a UE, on a transmission resource associated with an uplink grant in the plurality of uplink grants. In some examples, the operation(s) at block 1325 may include receiving transmissions from at least two UEs, on transmission resources associated with at least two uplink grants in the plurality of uplink grants. The operation(s) at block 1325 may be performed using the wireless communication manager 720 described with reference to FIG. 1, 7, 8, or 10, or the scheduled transmission reception manager 805 described with reference to FIG. 8.

At block 1330, the method 1300 may optionally include identifying, based at least in part on the transmission resource on which the transmission is received, at least one aspect of the UE. In some examples, the at least one aspect of the UE may include a feature set supported by the UE, or a channel bandwidth supported by the UE, or an amount of data in a transmit buffer of the UE, or a service used by the UE, or a service requirement of the UE, or a QoS requirement of the UE, or an access priority of the UE, or different slices, or combinations thereof. The operation(s) at block 1330 may be performed using the wireless communication manager 720 described with reference to FIG. 1, 7, 8, or 10, or the UE aspect identifier 810 described with reference to FIG. 8.

At block 1335, the method 1300 may optionally include transmitting a contention resolution to the UE. The operation(s) at block 1335 may be performed using the wireless communication manager 720 described with reference to FIG. 1, 7, 8, or 10, or the contention resolution manager 815 described with reference to FIG. 8.

Figure 14:
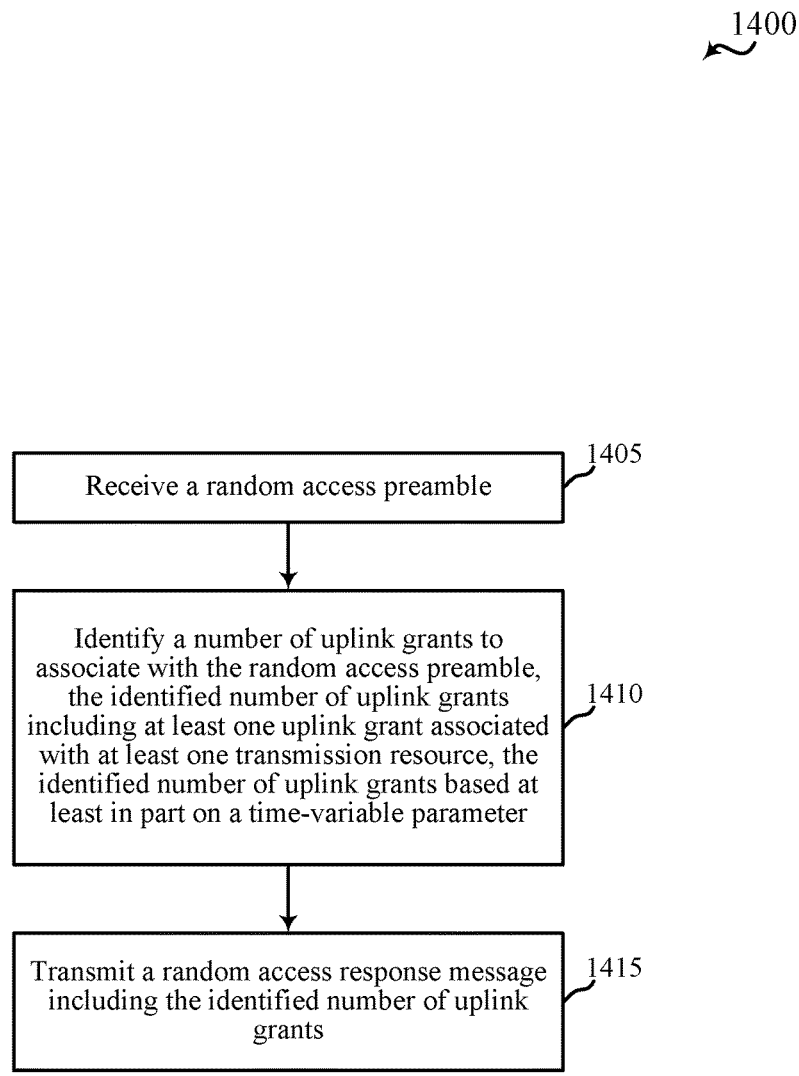
FIG. 14 is a flow chart illustrating an example of a method for wireless communication at a network access device, in accordance with one or more aspects of the present disclosure.

FIG. 14 is a flow chart illustrating an example of a method 1400 for wireless communication at a network access device, in accordance with one or more aspects of the present disclosure. For clarity, the method 1400 is described below with reference to aspects of one or more of the base stations 105 described with reference to FIG. 1, aspects of one or more of the network access devices 205 described with reference to FIG. 2 or 10, aspects of the apparatus 705 described with reference to FIG. 7, or aspects of one or more of the wireless communication managers 720 described with reference to FIG. 1, 7, 8, or 10. In some examples, a network access device may execute one or more sets of codes to control the functional elements of the network access device to perform the functions described below. Additionally or alternatively, the network access device may perform one or more of the functions described below using special-purpose hardware.

At block 1405, the method 1400 may include receiving a random access preamble. The operation(s) at block 1405 may be performed using the wireless communication manager 720 described with reference to FIG. 1, 7, 8, or 10, or the random access preamble reception manager 735 described with reference to FIG. 7 or 8.

At block 1410, the method 1400 may include identifying a number of uplink grants to associate with the random access preamble. The identified number of uplink grants may include at least one uplink grant (e.g., a single uplink grant or a plurality of uplink grants) associated with at least one transmission resource. The identified number of uplink grants may be based at least in part on a time-variable parameter. The operation(s) at block 1410 may be performed using the wireless communication manager 720 described with reference to FIG. 1, 7, 8, or 10, or the uplink grant manager 745 described with reference to FIG. 7 or 8.

In some examples, the number of uplink grants may be identified, at block 1410, based at least in part on a network load, or an estimate of a number of collisions between transmissions of the random access preamble by different UEs, or an estimate of a number of collisions between transmissions by different UEs using a same uplink grant included in the random access response message, or a number of channel elements in a receiver of the network access device, or a number of available transmission resources, or a time of receipt of the random access preamble, or combinations thereof.

At block 1415, the method 1400 may include transmitting a random access response message including the identified number of uplink grants. The operation(s) at block 1415 may be performed using the wireless communication manager 720 described with reference to FIG. 1, 7, 8, or 10, or the random access response transmission manager 740 described with reference to FIG. 7 or 8.

The methods 1100, 1200, 1300, and 1400 described with reference to FIGS. 11, 12, 13, and 14 may provide for wireless communication. It should be noted that the methods 1100, 1200, 1300, and 1400 are just example implementations, and the operations of the methods 1100, 1200, 1300, and 1400 may be rearranged or otherwise modified such that other implementations are possible.

Techniques described herein may be used for various wireless communication systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A may be referred to as CDMA2000 1x, 1x, etc. IS-856 (TIA-856) may be referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP LTE and LTE-A are new releases of UMTS that use E-UTRA. UTRA, E-UTRA, UMTS, LTE, LTE-A, and GSM are described in documents from an organization named 3GPP. CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over an unlicensed or shared bandwidth. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent all of the examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates an inclusive list such that, for example, a phrase referring to "at least one of" a list of items refers to any combination of those items, including single members. As an example, "at least one of: A, B, or C" is intended to cover A, B, C, A-B, A-C, B-C, and A-B-C., as well as any combination with multiples of the same element (e.g., A-A A-A-A, A-A-B, A-A-C, A-B-B, A-C-C, B-B, B-B-B, B-B-C, C-C, and C-C-C or any other ordering of A, B, and C).

As used herein, the phrase "based on" shall not be construed as a reference to a closed set of conditions. For example, an exemplary feature that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel techniques disclosed herein.

What is claimed is:

1. A method for wireless communication at a user equipment (UE), comprising:
    transmitting a random access preamble sequence;
    receiving a random access response message that includes a plurality of uplink grants each corresponding to the transmitted random access preamble sequence, wherein each uplink grant of the plurality of uplink grants is associated with a different transmission resource; the plurality of uplink grants comprising:
    a first uplink grant corresponding to the transmitted random access preamble sequence and associated with a first transmission resource; and
    a second uplink grant corresponding to the transmitted random access preamble sequence and associated with a second transmission resource, the second transmission resource associated with a different transmission time than the first transmission resource, a different transmission frequency than the first transmission resource, a different scrambling code than the first transmission resource, or a different beam index than the first transmission resource, or a combination thereof;
    selecting an uplink grant from the plurality of uplink grants included in the random access response message and each corresponding to the transmitted random access preamble sequence one of the first uplink grant or the second uplink grant; and
    transmitting using the selected uplink grant.

2. The method of claim 1, wherein the selecting the uplink grant one of the first uplink grant or the second uplink grant comprises:
    randomly selecting the uplink grant from the plurality of uplink grants each corresponding to the transmitted random access preamble sequence the one of the first uplink grant or the second uplink grant.

3. The method of claim 1, wherein at least two of the plurality of uplink grants each corresponding to the transmitted random access preamble sequence the first uplink grant and the second uplink grant are associated with different feature sets, and wherein the selected uplink grant is selected based at least in part on a feature set supported by the UE.

4. The method of claim 1, wherein at least two of the plurality of uplink grants each corresponding to the transmitted random access preamble sequence the first uplink grant and the second uplink grant are associated with different maximum channel bandwidths, and wherein the selected uplink grant is selected based at least in part on a maximum channel bandwidth supported by the UE.

5. The method of claim 1, wherein at least two of the plurality of uplink grants each corresponding to the transmitted random access preamble sequence the first uplink grant and the second uplink grant are associated with different payload sizes, and wherein the selected uplink grant is selected based at least in part on an amount of data in a transmit buffer of the UE.

6. The method of claim 1, wherein at least two of the plurality of uplink grants each corresponding to the transmitted random access preamble sequence the first uplink grant and the second uplink grant are associated with at least one of:

different sets of services, or different service requirements, or different quality of service (QoS) profiles, or different access priorities, or different slices, or combinations thereof.

7. The method of claim 1, wherein the selected uplink grant is selected based at least in part on:
a service used by the UE, or a service requirement of the UE, or a quality of service (QoS) requirement of the UE, or an access priority of the UE, or different slices, or combinations thereof.

8. The method of claim 1, further comprising:
not selecting a second an uplink grant from the plurality of uplink grants included in the random access response message and each corresponding to the transmitted random access preamble sequence; and
refraining from transmitting using the second not selected uplink grant.

9. A method for wireless communication at a network access device, comprising:
receiving a random access preamble sequence; and
transmitting a random access response message that includes a plurality of uplink grants each corresponding to the received random access preamble sequence, wherein each uplink grant of the plurality of uplink grants is associated with a different transmission resource the plurality of uplink grants comprising:
a first uplink grant corresponding to the received random access preamble sequence and associated with a first transmission resource; and
a second uplink grant corresponding to the received random access preamble sequence and associated with a second transmission resource, the second transmission resource associated with a different transmission time than the first transmission resource, a different transmission frequency than the first transmission resource, a different scrambling code than the first transmission resource, or a different beam index than the first transmission resource, or a combination thereof.

10. The method of claim 9, further comprising:
receiving, based at least in part on transmitting the random access response message, transmissions from at least two user equipments (UEs) on respective transmission resources associated with at least two uplink grants of the plurality of uplink grants each corresponding to the received random access preamble sequence.

11. The method of claim 9, further comprising:
identifying a quantity of uplink grants in the plurality of uplink grants each corresponding to the received random access preamble sequence based at least in part on: a network load, or an estimate of a quantity of collisions between transmissions of the random access preamble sequence by different user equipments (UEs), or an estimate of a quantity of collisions between transmissions by different UEs using a same uplink grant included in the random access response message, or a quantity of channel elements in a receiver of the network access device, or a quantity of available transmission resources, or a time of receipt of the random access preamble sequence, or combinations thereof.

12. The method of claim 9, further comprising:
associating at least two of the plurality of uplink grants each corresponding to the received random access preamble sequence the first uplink grant and the second uplink grant with:
different feature sets, or different maximum channel bandwidths, or different payload sizes, or different sets of services, or different service requirements, or different quality of service (QoS) profiles, or different access priorities, or different slices, or combinations thereof.

13. The method of claim 12, further comprising:
receiving a transmission, from a user equipment (UE), on a transmission resource associated with an uplink grant of the plurality of uplink grants; and
identifying, based at least in part on the transmission resource on which the transmission is received, at least one of: a feature set supported by the UE, or a channel bandwidth supported by the UE, or an amount of data in a transmit buffer of the UE, or a service used by the UE, or a service requirement of the UE, or a QoS requirement of the UE, or an access priority of the UE, or different slices, or combinations thereof.

14. An apparatus for wireless communication at a user equipment (UE), comprising:
a processor;
memory coupled with the processor; and
instructions stored in the memory and operable, when executed by the processor, to cause the apparatus to:
transmit a random access preamble sequence;
receive a random access response message that includes a plurality of uplink grants each corresponding to the transmitted random access preamble sequence, wherein each uplink grant of the plurality of uplink grants is associated with a different transmission resource the plurality of uplink grants comprising:
a first uplink grant corresponding to the transmitted random access preamble sequence and associated with a first transmission resource; and
a second uplink grant corresponding to the transmitted random access preamble sequence and associated with a second transmission resource, the second transmission resource associated with a different transmission time than the first transmission resource, a different transmission frequency than the first transmission resource, a different scrambling code than the first transmission resource, or a different beam index than the first transmission resource, or a combination thereof;
select an uplink grant from the plurality of uplink grants included in the random access response message and each corresponding to the transmitted random access preamble sequence one of the first uplink grant or the second uplink grant; and
transmit using the selected uplink grant.

15. The apparatus of claim 14, wherein the instructions to select the uplink grant one of the first uplink grant or the second uplink grant are operable, when executed by the processor, to cause the apparatus to:
randomly select uplink grant from the plurality of uplink grants each corresponding to the transmitted random access preamble sequence the one of the first uplink grant or the second uplink grant.

16. The apparatus of claim 14, wherein at least two of the plurality of uplink grants each corresponding to the transmitted random access preamble sequence the first uplink grant and the second uplink grant are associated with different feature sets, and wherein the selected uplink grant is selected based at least in part on a feature set supported by the UE.

17. The apparatus of claim 14, wherein at least two of the plurality of uplink grants each corresponding to the transmitted random access preamble sequence the first uplink grant and the second uplink grant are associated with different maximum channel bandwidths, and wherein the selected uplink grant is selected based at least in part on a maximum channel bandwidth supported by the UE.

18. The apparatus of claim 14, wherein at least two of the plurality of uplink grants each corresponding to the transmitted random access preamble sequence the first uplink grant and the second uplink grant are associated with different payload sizes, and wherein the selected uplink grant is selected based at least in part on an amount of data in a transmit buffer of the UE.

19. The apparatus of claim 14, wherein at least two of the plurality of uplink grants each corresponding to the transmitted random access preamble sequence the first uplink grant and the second uplink grant are associated with at least one of:
different sets of services, or different service requirements, or different quality of service (QoS) profiles, or different access priorities, or different slices, or combinations thereof.

20. The apparatus of claim 14, wherein the selected uplink grant is selected based at least in part on:
a service used by the UE, or a service requirement of the UE, or a quality of service (QoS) requirement of the UE, or an access priority of the UE, or different slices, or combinations thereof.

21. The apparatus of claim 14, wherein the instructions are further operable, when executed by the processor, to cause the apparatus to:
not select a second an uplink grant from the plurality of uplink grants included in the random access response message and each corresponding to the transmitted random access preamble sequence; and
refrain from transmitting using the second not selected uplink grant.

22. An apparatus for wireless communication at a network access device, comprising:
a processor;
memory coupled with the processor; and
instructions stored in the memory and operable, when executed by the processor, to cause the apparatus to:
receive a random access preamble sequence; and
transmit a random access response message that includes a plurality of uplink grants each corresponding to the received random access preamble sequence, wherein each uplink grant of the plurality of uplink grants is associated with a different transmission resource the plurality of uplink grants comprising:
a first uplink grant corresponding to the received random access preamble sequence and associated with a first transmission resource; and
a second uplink grant corresponding to the received random access preamble sequence and associated with a second transmission resource, the second transmission resource associated with a different transmission time than the first transmission resource, a different transmission frequency than the first transmission resource, a different scrambling code than the first transmission resource, or a different beam index than the first transmission resource, or a combination thereof.

23. The apparatus of claim 22, wherein the instructions are operable, when executed by the processor, to cause the apparatus to:
receive, based at least in part on transmitting the random access response message, transmissions from at least two user equipments (UEs) on respective transmission resources associated with at least two uplink grants of the plurality of uplink grants each corresponding to the received random access preamble sequence.

24. The apparatus of claim 22, wherein the instructions are operable, when executed by the processor, to cause the apparatus to:
identify a quantity of uplink grants in the plurality of uplink grants each corresponding to the received random access preamble sequence based at least in part on: a network load, or an estimate of a quantity of collisions between transmissions of the random access preamble sequence by different user equipments (UEs), or an estimate of a quantity of collisions between transmissions by different UEs using a same uplink grant included in the random access response message, or a quantity of channel elements in a receiver of the network access device, or a quantity of available transmission resources, or a time of receipt of the random access preamble sequence, or combinations thereof.

25. The apparatus of claim 22, wherein the instructions are operable, when executed by the processor, to cause the apparatus to:
associate at least two of the plurality of uplink grants each corresponding to the received random access preamble sequence the first uplink grant and the second uplink grant with:
different feature sets, or different maximum channel bandwidths, or different payload sizes, or different sets of services, or different service requirements, or different quality of service (QoS) profiles, or different access priorities, or different slices, or combinations thereof.

26. The apparatus of claim 25, wherein the instructions are operable, when executed by the processor, to cause the apparatus to:
receive a transmission, from a user equipment (UE), on a transmission resource associated with an uplink grant of the plurality of uplink grants; and
identify, based at least in part on the transmission resource on which the transmission is received, at least one of: a feature set supported by the UE, or a channel bandwidth supported by the UE, or an amount of data in a transmit buffer of the UE, or a service used by the UE, or a service requirement of the UE, or a QoS requirement of the UE, or an access priority of the UE, or different slices, or combinations thereof.

* * * * *